US011800469B2

(12) United States Patent
Yu et al.

(10) Patent No.: US 11,800,469 B2
(45) Date of Patent: *Oct. 24, 2023

(54) COMMUNICATION METHOD AND COMMUNICATIONS APPARATUS

(71) Applicant: HUAWEI TECHNOLOGIES CO., LTD., Guangdong (CN)

(72) Inventors: Feng Yu, Beijing (CN); Bo Lin, Shenzhen (CN); Guangwei Yu, Beijing (CN); Jiangwei Ying, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,246

(22) Filed: Jan. 13, 2023

(65) Prior Publication Data
US 2023/0180154 A1 Jun. 8, 2023

Related U.S. Application Data

(63) Continuation of application No. 16/676,241, filed on Nov. 6, 2019, now Pat. No. 11,570,730, which is a (Continued)

(30) Foreign Application Priority Data

Feb. 14, 2018 (CN) .......................... 201810152309.0

(51) Int. Cl.
*H04W 56/00* (2009.01)
*H04W 12/08* (2021.01)
*H04W 12/10* (2021.01)

(52) U.S. Cl.
CPC ......... *H04W 56/001* (2013.01); *H04W 12/08* (2013.01); *H04W 12/10* (2013.01)

(58) Field of Classification Search
CPC .... H04W 56/001; H04W 12/08; H04W 12/10
(Continued)

(56) References Cited

U.S. PATENT DOCUMENTS

2006/0182147 A1* 8/2006 Sanchez ............ H04W 56/0045
370/503
2014/0211780 A1* 7/2014 Kang .................... H04W 76/10
370/350
(Continued)

FOREIGN PATENT DOCUMENTS

| CN | 101795432 A | 8/2010 |
|---|---|---|
| CN | 102164403 A | 8/2011 |

(Continued)

OTHER PUBLICATIONS

3GPP TR 22.804 V1.0.0 (Dec. 2017), "3rd Generation Partnership Project; Technical Specification Group Services and System Aspects; Study on Communication for Automation in Vertical Domains (Release 16)," Dec. 2017, 137 pages.
(Continued)

*Primary Examiner* — Hermon Asres
(74) *Attorney, Agent, or Firm* — Fish & Richardson P.C.

(57) ABSTRACT

This application provides a communication method and a communications device. One example method includes: receiving, by a first communications device, first information from a third communications device; and sending, by the third communications device, the first information to the first communications device.

18 Claims, 6 Drawing Sheets

Related U.S. Application Data continuation of application No. PCT/CN2019/074818, filed on Feb. 12, 2019.

(58) Field of Classification Search
USPC .............................................................. 726/4
See application file for complete search history.

(56) References Cited

U.S. PATENT DOCUMENTS

| | | | |
|---|---|---|---|
| 2015/0139071 A1* | 5/2015 | Wu | H04W 56/0015 370/324 |
| 2018/0205476 A1 | 7/2018 | Wang et al. | |

FOREIGN PATENT DOCUMENTS

| | | |
|---|---|---|
| CN | 102448030 A | 5/2012 |
| CN | 103796296 A | 5/2014 |
| CN | 104394586 A | 3/2015 |
| CN | 105262555 A | 1/2016 |
| CN | 105744616 A | 7/2016 |
| CN | 105933877 A | 9/2016 |
| EP | 2816749 A1 | 12/2014 |
| WO | 2010051862 A1 | 5/2010 |
| WO | 2013064937 A1 | 5/2013 |
| WO | 2017049521 A1 | 3/2017 |

OTHER PUBLICATIONS

3GPP TS 22.261 V16.2.0 (Dec. 2017), "3rd Generation Partnership Project; Technical Specification Group Services and System Aspects; Service requirements for the 5G system;Stage 1 (Release 16)," Dec. 2017, 53 pages.

3GPP TS 24.008 V11.17.1 (Jan. 2018), "3rd Generation Partnership Project; Technical Specification Group Core Network and Terminals; Mobile radio interface Layer 3 specification; Core network protocols; Stage 3 (Release 11)," Jan. 2018, 684 pages.

3GPP TS 24.301 V15.1.1 (Jan. 2018), "3rd Generation Partnership Project; Technical Specification Group Core Network and Terminals; Non-Access-Stratum (NAS) protocol for Evolved Packet System (EPS); Stage 3 (Release 15)," Jan. 2018, 506 pages.

Extended European Search Report issued in European Application No. 19754318.4 dated May 12, 2020, 12 pages.

Office Action issued in Chinese Application No. 201810152309.0 dated Feb. 3, 2020, 29 pages (with English translation).

Office Action issued in Indian Application No. 201937045024 dated Feb. 12, 2021, 6 pages.

PCT International Search Report and Written Opinion issued in International Application No. PCT/CN2019/074818 dated Apr. 26, 2019, 12 pages (partial English translation).

\* cited by examiner

COMMUNICATION METHOD AND COMMUNICATIONS APPARATUS

CROSS-REFERENCE TO RELATED APPLICATIONS

This application is a continuation of U.S. patent application Ser. No. 16/676,241, filed on Nov. 6, 2019, which is a continuation of International Application No. PCT/CN2019/074818, filed on Feb. 12, 2019, which claims priority to Chinese Patent Application No. 201810152309.0, filed on Feb. 14, 2018. All of the afore-mentioned patent applications are hereby incorporated by reference in their entireties.

TECHNICAL FIELD

This application relates to the communications field, and more specifically, to a communication method and a communications apparatus.

BACKGROUND

As the 4th generation (4G) mobile communication enters a large-scale commercial use stage, the 5th generation (5G) communications technology has become a global research hotspot. As main driving forces for future communication development, a mobile internet and an internet of things greatly affect fields such as living, working, leisure, and transportation of people, and requirements of a 5G operator are diversified. In a 5G communication scenario, terminals need to implement accurate time synchronization for some services that have a relatively high latency requirement. Because it is relatively difficult to implement synchronization through direct communication between the terminals, a base station currently serves as a centralized controller of the terminals. The base station serves as a time synchronization source, so that all terminals in a cell keep time synchronization with the base station, to indirectly implement time synchronization between the terminals.

However, in many cases, an operator may not want to provide such a time synchronization service for all terminals. However, a range of time synchronization cannot be controlled in a current network mechanism. Therefore, a solution needs to be urgently proposed to provide time synchronization for a specific terminal.

SUMMARY

This application provides a communication method and a communications apparatus, to obtain authorization information, and determine, based on the authorization information, a communications device for which a time synchronization service needs to be provided, to avoid broadcasting time information to all communications devices, so that a time synchronization service can be provided for a specific communications device.

According to a first aspect, a communication method is provided, and includes:

obtaining, by a first communications device, authorization information, where the authorization information indicates that a second communications device is a device that needs to perform time synchronization; and providing, by the first communications device, time information for the second communications device based on the authorization information; or obtaining, by the first communications device, authorization information, where the authorization information indicates that the second communications device is not a device that needs to perform time synchronization; and skipping, by the first communications device, providing time information for the second communications device based on the authorization information.

In this embodiment of this application, if the authorization information indicates that the second communications device is the device for which a time synchronization service needs to be provided, the first communications device provides the second communications device with a service of performing the time synchronization with a reference clock. If the authorization information indicates that the second communications device is not the device for which a time synchronization service needs to be provided, the first communications device does not provide the time synchronization service for the second communications device, or the first communications device determines not to provide the time synchronization service for the second communications device. In this way, the first communications device can determine, by using content indicated by the authorization information, a communications device for which the time synchronization service needs to be provided, to avoid broadcasting the time information to all communications devices, and help implement control, authorization, or charging of the communications device for which the time synchronization service needs to be provided.

Optionally, the time information is used by the second communications device to perform the time synchronization.

In a possible implementation, that the authorization information indicates that a second communications device is a device that needs to perform time synchronization specifically includes that the authorization information carries first indication information and/or first time accuracy information, where the first indication information is used to indicate that the second communications device is the device that needs to perform the time synchronization, and the first time accuracy information is used to indicate accuracy required for the time synchronization; or that the authorization information indicates that the second communications device is not a device that needs to perform time synchronization specifically includes that the authorization information carries second indication information and/or second time accuracy information, where the second indication information is used to indicate that the second communications device is not the device that needs to perform the time synchronization, and the second time accuracy information is used to indicate that accuracy required for the time synchronization is a preset value; optionally, the preset value may be 0, or may be an infinity value or an infinitesimal value; optionally, the preset value may be predefined in a protocol, or may be configured by the first communications device; and this is not limited.

In a possible implementation, the method further includes:

adding, by the first communications device, the authorization information to a context of the second communications device.

Optionally, the first communications device stores the authorization information in the context of the second communications device, or updates the context of the second communications device based on the authorization information.

In a possible implementation, the obtaining, by a first communications device, authorization information includes:

receiving, by the first communications device, the authorization information sent by a third communications device.

Optionally, the third communications device is a core network node or a network device.

Therefore, the first communications device can receive the authorization information directly sent by the third communications device.

In a possible implementation, the method further includes:

receiving, by the first communications device, quality of service information sent by a third communications device; and the obtaining, by a first communications device, authorization information includes:

determining, by the first communications device, the authorization information based on the quality of service information and a first correspondence, where the first correspondence is a correspondence between the quality of service information and the authorization information.

Optionally, the quality of service information may include a quality of service QoS parameter. Optionally, the QoS parameter includes a QCI (Qos class identifier), a service class, a service category, an allocation and retention priority, guaranteed bit rate (GBR) QoS information, a latency, reliability, a packet loss rate, a jitter parameter, or the like.

Therefore, the first communications device can determine the authorization information with reference to the first correspondence by receiving the quality of service information sent by the third communications device.

In a possible implementation, the method further includes:

receiving, by the first communications device, network slice information sent by a third communications device; and the obtaining, by a first communications device, authorization information includes:

determining, by the first communications device, the authorization information based on the network slice information and a second correspondence, where the second correspondence is a correspondence between the network slice information and the authorization information.

Optionally, the network slice information includes at least one of a slice identifier, a slice type, network slice selection assistance information, and the like.

Therefore, the first communications device can determine the authorization information with reference to the second correspondence by receiving the network slice information sent by the third communications device.

Optionally, the providing, by the first communications device, time information for the second communications device based on the authorization information includes:

providing, by the first communications device based on the authorization information, the second communications device with a service of performing the time synchronization with a reference clock.

In a possible implementation, the providing, by the first communications device based on the authorization information, the second communications device with a service of performing the time synchronization with a reference clock includes:

sending, by the first communications device, a time synchronization message to the second communications device, where the time synchronization message is used by the second communications device to obtain the time information.

In a possible implementation, the time synchronization message includes one or more of the following information:

time information corresponding to the first time accuracy information, scrambling information used to decode the time information, key information used to decrypt the time information, timer information used to perform the time synchronization with the first communications device, a radio resource required for the time synchronization, and a reference signal required for the time synchronization. Therefore, the first communications device can send the time synchronization message to the second communications device, so that the second communications device can perform the time synchronization based on the time synchronization message.

Alternatively, the time synchronization message includes information indicating that a request of the second communications device for performing the time synchronization is rejected.

According to a second aspect, a communication method is provided, and includes:

sending, by a third communications device, first information to a first communications device, where the first information is used by the first communications device to obtain authorization information, and the authorization information indicates that a second communications device is a device that needs to perform time synchronization, or the authorization information indicates that the second communications device is not a device that needs to perform time synchronization; and receiving, by the third communications device, a response message sent by the first communications device, where the response message indicates that the first communications device obtains the first information.

In this embodiment of this application, the third communications device sends the first information to the first communications device, so that the first communications device obtains the authorization information based on the first information. The authorization information indicates that the second communications device is the device that needs to perform the time synchronization, or the authorization information indicates that the second communications device is not the device that needs to perform the time synchronization.

In a possible implementation, that the authorization information indicates that a second communications device is a device that needs to perform time synchronization specifically includes that the authorization information carries first indication information and/or first time accuracy information, where the first indication information is used to indicate that the second communications device is the device that needs to perform the time synchronization, and the time accuracy information is used to indicate accuracy required for the time synchronization; or that the authorization information indicates that the second communications device is not a device that needs to perform time synchronization specifically includes that the authorization information carries second indication information and/or second time accuracy information, where the second indication information is used to indicate that the second communications device is not the device that needs to perform the time synchronization, and the second time accuracy information is used to indicate that accuracy required for the time synchronization is a preset value; and optionally, the preset value may be 0, or may be an infinity value or an infinitesimal value.

In a possible implementation, the first information is the authorization information.

Therefore, the third communications device can directly send the authorization information to the first communications device.

In a possible implementation, the sending, by a third communications device, first information to a first communications device includes:

sending, by the third communications device, quality of service information to the first communications device, where the quality of service information of the first service is used by the first communications device to determine the authorization information based on a first correspondence, and the first correspondence is a correspondence between the quality of service information and the authorization information.

Optionally, the quality of service information may include a quality of service QoS parameter. Optionally, the QoS parameter includes a QCI (Qos class identifier), a service class, a service category, an allocation and retention priority, guaranteed bit rate (GBR) QoS information, a latency, reliability, a packet loss rate, a jitter parameter, or the like.

Therefore, the third communications device can send the quality of service information to the first communications device, so that the first communications device can determine the authorization information based on the quality of service information.

In a possible implementation, the sending, by a third communications device, first information to a first communications device includes:

sending, by the third communications device, network slice information to the first communications device, where the network slice information is used by the first communications device to determine the authorization information based on a second correspondence, and the second correspondence is a correspondence between the network slice information and the authorization information.

Optionally, the network slice information includes at least one of a slice identifier, a slice type, network slice selection assistance information, and the like.

Therefore, the third communications device can send the network slice information to the first communications device, so that the first communications device can determine the authorization information based on the network slice information.

According to a third aspect, a communication method is provided, and includes:

obtaining, by a second communications device, time information provided by a first communications device; and performing, by the second communications device, time synchronization based on the time.

Optionally, the obtaining, by a second communications device, time information provided by a first communications device includes:

obtaining, by the second communications device, a service that is of performing the time synchronization with a reference clock and that is provided by the first communications device.

In a possible implementation, the obtaining, by the second communications device, a service that is of performing the time synchronization with a reference clock and that is provided by the first communications device includes:

receiving, by the second communications device, a time synchronization message from the first communications device, where the time synchronization message is used by the second communications device to obtain time synchronization information.

In a possible implementation, the time synchronization message includes one or more of the following information:

time information corresponding to the first time accuracy information, scrambling information used to decode the time information, key information used to decrypt the time information, timer information used to perform the time synchronization with the first communications device, a radio resource required for the time synchronization, and a reference signal required for the time synchronization.

Alternatively, the time synchronization message includes information indicating that a request of the second communications device for performing the time synchronization is rejected.

According to a fourth aspect, a communication method is provided, and includes:

obtaining, by a radio access network node, authorization information for a first service of a terminal from a core network control plane node or a neighboring radio access network node; and if authorization is performed, in a downlink direction, generating, by an access stratum (AS stratum) of the radio access network node, service data of the first service, and sending the service data to the terminal; or if authorization is performed, in an uplink direction, after receiving service data that is of the first service and that is sent by the terminal, terminating, by an access stratum of the radio access network node, transmission of the packet; or if authorization is not performed, prohibiting, by an access stratum of the radio access network node, from providing the first service for the terminal; or if authorization is not performed, refusing, by an access stratum of the radio access network node, to provide the first service for the terminal; or if authorization is not performed, generating, by an access stratum of the radio access network node, an indication for refusing to provide the first service, and sending the indication to the terminal.

In this embodiment of this application, authorization is performed at a granularity of a service of the terminal. To be specific, the core network control plane node can separately perform authorization on a plurality of services of the terminal, to provide a more flexible management manner.

In a possible implementation, a protocol layer at which the first service is carried ends at the access stratum between the radio access network node and the terminal.

In a possible implementation, the first service includes at least one of time serving, positioning, voice, video, a V2V service, a V2X service, a latency sensitive service (time sensitive service), a bandwidth service, and a local exchange service.

According to a fifth aspect, a communications apparatus is provided. The communications apparatus is a network device, or may be a chip or a circuit, and is configured to perform the method in any one of the first aspect or the possible implementations of the first aspect. Specifically, the communications apparatus may be implemented by hardware, or may be implemented by hardware executing corresponding software.

In some possible implementations, the communications apparatus includes a module configured to perform the method in any one of the first aspect or the possible implementations of the first aspect.

In some possible implementations, the communications apparatus includes a processor and a memory. The memory is configured to store an instruction, and when the communications apparatus runs, the processor executes the instruction stored in the memory, so that the communications apparatus performs the communication method in any one of the first aspect or the implementation methods of the first aspect. It should be noted that the memory may be integrated into the processor, or may be independent of the processor.

In some possible implementations, the communications apparatus includes a processor. The processor is configured to: be coupled to a memory, read an instruction from the memory, and perform the communication method in any one of the first aspect or the implementation methods of the first aspect based on the instruction.

According to a sixth aspect, a communications apparatus is provided. The communications apparatus is a core network device or a network device, or may be a chip or a circuit, and is configured to perform the method in any one of the second aspect or the possible implementations of the second aspect. Specifically, the communications apparatus may be implemented by hardware, or may be implemented by hardware executing corresponding software.

In some possible implementations, the communications apparatus includes a module configured to perform the method in any one of the second aspect or the possible implementations of the second aspect.

In some possible implementations, the communications apparatus includes a processor and a memory. The memory is configured to store an instruction, and when the communications apparatus runs, the processor executes the instruction stored in the memory, so that the communications apparatus performs the communication method in any one of the second aspect or the implementation methods of the second aspect. It should be noted that the memory may be integrated into the processor, or may be independent of the processor.

In some possible implementations, the communications apparatus includes a processor. The processor is configured to: be coupled to a memory, read an instruction from the memory, and perform the communication method in any one of the second aspect or the implementation methods of the second aspect based on the instruction.

According to a seventh aspect, a communications apparatus is provided. The communications apparatus is a terminal device, or may be a chip or a circuit, and is configured to perform the method in any one of the third aspect or the possible implementations of the third aspect. Specifically, the communications apparatus may be implemented by hardware, or may be implemented by hardware executing corresponding software.

In some possible implementations, the communications apparatus includes a module configured to perform the method in any one of the third aspect or the possible implementations of the third aspect.

In some possible implementations, the communications apparatus includes a processor and a memory. The memory is configured to store an instruction, and when the communications apparatus runs, the processor executes the instruction stored in the memory, so that the communications apparatus performs the communication method in any one of the third aspect or the implementation methods of the third aspect. It should be noted that the memory may be integrated into the processor, or may be independent of the processor.

In some possible implementations, the communications apparatus includes a processor. The processor is configured to: be coupled to a memory, read an instruction from the memory, and perform the communication method in any one of the third aspect or the implementation methods of the third aspect based on the instruction.

According to an eighth aspect, a communications apparatus is provided. The communications apparatus is a radio access network node, or may be a chip or a circuit, and is configured to perform the method in any one of the fourth aspect or the possible implementations of the fourth aspect. Specifically, the communications apparatus may be implemented by hardware, or may be implemented by hardware executing corresponding software.

In some possible implementations, the communications apparatus includes a module configured to perform the method in any one of the fourth aspect or the possible implementations of the fourth aspect.

In some possible implementations, the communications apparatus includes a processor and a memory. The memory is configured to store an instruction, and when the communications apparatus runs, the processor executes the instruction stored in the memory, so that the communications apparatus performs the communication method in any one of the fourth aspect or the implementation methods of the fourth aspect. It should be noted that the memory may be integrated into the processor, or may be independent of the processor.

In some possible implementations, the communications apparatus includes a processor. The processor is configured to: be coupled to a memory, read an instruction from the memory, and perform the communication method in any one of the fourth aspect or the implementation methods of the fourth aspect based on the instruction.

According to a ninth aspect, a communications apparatus is provided. The communications apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the processor to perform the method in any one of the first aspect or the possible implementations of the first aspect.

According to a tenth aspect, a communications apparatus is provided. The communications apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the processor to perform the method in any one of the second aspect or the possible implementations of the second aspect.

According to an eleventh aspect, a communications apparatus is provided. The communications apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the processor to perform the method in any one of the third aspect or the possible implementations of the third aspect.

According to a twelfth aspect, a communications apparatus is provided. The communications apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the processor to perform the method in any one of the fourth aspect or the possible implementations of the fourth aspect.

According to a thirteenth aspect, a computer readable storage medium is provided. The computer readable storage medium stores a program, and the program enables a communications apparatus to perform the communication method in any one of the foregoing aspects and the implementations of the foregoing aspects.

According to a fourteenth aspect, this application further provides a computer program product including an instruction. When the computer program product runs on a computer, the computer is enabled to perform the communication method in any one of the foregoing aspects.

According to a fifteenth aspect, this application further provides a system. The system includes a network device, and the network device may be configured to perform steps performed by the first communications device in any one of the first aspect and the methods of the first aspect.

In some possible implementations, the system may further include a core network device. The core network device may be configured to perform steps performed by the third communications device in any one of the second aspect and the methods of the second aspect.

In some possible implementations, the system may further include a terminal device. The terminal device may be configured to perform steps performed by the second communications device in any one of the third aspect and the methods of the third aspect.

In some possible implementations, the system may further include another device that interacts with one or more of the core network device, the terminal device, and the network device in this embodiment of this application, or the like.

According to a sixteenth aspect, this application further provides a system. The system includes a radio access network node, and the radio access network node may be configured to perform steps performed by the radio access network node in any one of the fourth aspect and the methods of the fourth aspect.

In some possible implementations, the system may further include a core network control plane node. The core network control plane node is configured to send authorization information for a first service of a terminal to the radio access network node.

In some possible implementations, the system may further include a terminal. The terminal may be configured to perform steps performed by the terminal in any one of the fourth aspect and the methods of the fourth aspect.

In some possible implementations, the system may further include another device that interacts with one or more of the radio access network node, the terminal, and the core network control plane node in this embodiment of this application, or the like.

According to a seventeenth aspect, a chip system is provided, and includes a memory and a processor. The memory is configured to store a computer program, and the processor is configured to: invoke the computer program from the memory and run the computer program, so that a communications device in which the chip system is installed performs the method in any one of the foregoing aspects and the possible implementations of the foregoing aspects.

DESCRIPTION OF EMBODIMENTS

Figure 1:
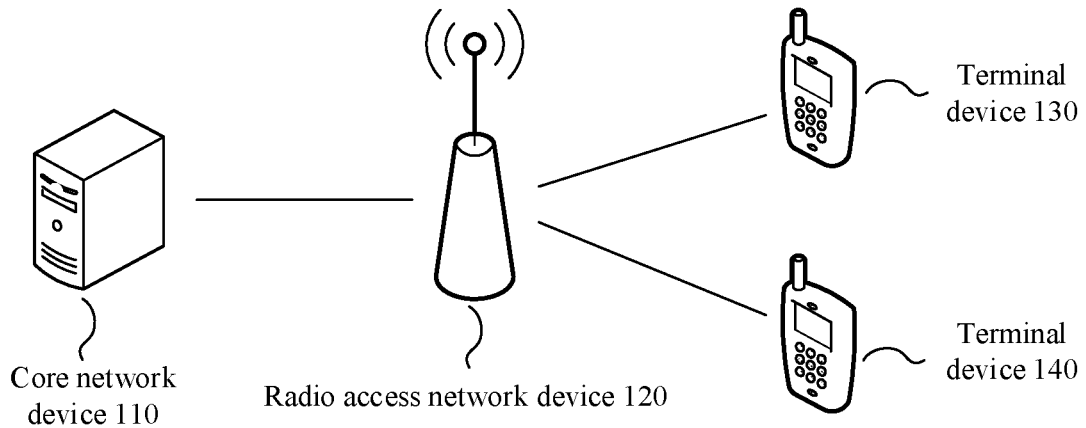
FIG. 1 is an architectural diagram of a mobile communications system to which an embodiment of this application is applied.

The following describes technical solutions of this application with reference to accompanying drawings.

In the embodiments of this application, "a plurality of" may be understood as "at least two"; and "a plurality of" may be understood as "at least two".

The technical solutions of the embodiments of this application may also be applied to various communications systems, for example, a global system for mobile communications (GSM), a code division multiple access (CDMA) system, a wideband code division multiple access (WCDMA) system, a communications system based on an orthogonal frequency division multiplexing (OFDM) technology, a general packet radio service (GPRS) system, a long term evolution (LTE) system, an LTE frequency division duplex (FDD) system, an LTE time division duplex (TDD) system, a universal mobile telecommunications system (UMTS), a wireless fidelity (Wi-Fi) system, a worldwide interoperability for microwave access (WiMAX) communications system, a wireless local area network (WLAN) system, a public land mobile network (PLMN) network, a vehicle-to-everything (V2X) system, a future 5th generation (5G) system, or a new radio (NR) system.

It should be understood that a communication method in the embodiments of this application may be applied to an application scenario sensitive to time synchronization or a latency, for example, an automated or assisted driving scenario, an augmented reality (AR) scenario, a virtual reality (VR) scenario, a tactile internet scenario, an industrial control scenario, a smart grid scenario, a real-time gaming scenario, a process automation scenario, and an industrial automation (factory automation) scenario. This is not limited in the embodiments of this application.

For example, in an industrial control scenario, a controller and an executor need to keep time synchronization. The controller sends control signaling to the executor to instruct the executor to execute a command at a determined time. If the executor and the controller have different perceptions of a time, in other words, a time of the executor is not synchronized with a time of the controller, the executor executes a command at an incorrect time, and consequently a task fails to be performed. For example, the controller instructs the executor (for example, a mechanical arm) to start rotating to the left at a constant speed at 3 o'clock with an angular velocity of w and a rotation time t of 5 s. However, actually, because the time of the executor is not synchronized with the time of the controller, 3 o'clock considered by the executor is 1 second past 3 o'clock considered by the controller. Therefore, the executor starts rotating for 5 s from 1 second past 3 o'clock to 6 seconds past 3 o'clock. The executor may conflict with another executor due to the latency of 1 s, and consequently smooth operation in industrial control is affected. Therefore, time synchronization in industrial control is particularly important.

For example, in a smart grid, phase measurement modules (for example, data transmission units (DTU)) need to perform time synchronization. A DTU serves as UE and is deployed in a ring main unit to sense a change in a voltage, a current, or the like. A power distribution network may use the DTU for differential protection of the power distribution network. Each of adjacent DTUs learns of a value of a sampled current through periodic interaction. All the DTUs sample the current at a fixed and same time (namely, a pre-configured time). Each DTU compares a value of a current sampled by the DTU at a same moment with a value of a current sampled by a neighboring DTU at the same moment. If a difference between the two values exceeds a current threshold, it is considered that a circuit between the two DTUs is faulty. In this case, each DTU switches off the switch for isolation protection of the current. In this scenario, times of every two adjacent DTUs need to be synchronized. Otherwise, DTUs whose times are not synchronized sample a current at different times. Consequently, a deviation of a value of a normally sampled current occurs. A larger time synchronization error indicates a larger deviation value of the current. Once the deviation exceeds a current threshold, a false alarm occurs. During power consumption of a user, an entire cell or a part of a cell is powered off due to the false alarm, thereby resulting in very poor user experience. During industrial power consumption, a factory or a workshop is powered off due to the false alarm, thereby resulting in unnecessary economic losses. Therefore, time synchronization is particularly important in the smart grid.

A mobile communications system to which an embodiment of this application is applied is described below with reference to an example in FIG. 1. FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be separate and different physical devices, and may integrate a function of the core network device and a logical function of the radio access network device into a same physical device, or may integrate some functions of the core network device and some functions of the radio access network device into one physical device. The terminal device may be fixed or removable. It should be understood that FIG. 1 is merely a schematic diagram. The communications system may further include another network device, for example, may further include a wireless relay device and a wireless backhaul device (that are not shown in FIG. 1). Quantities of core network devices, radio access network devices, and terminal devices included in the mobile communications system are not limited in this embodiment of this application.

The radio access network device is an access device or a network device that is used by the terminal device to access the mobile communications system in a wireless manner. The radio access network device may be a NodeB, an evolved NodeB (eNodeB), a gNB in a 5G mobile communications system, a base station in a future mobile communications system, an access node in a Wi-Fi system, or the like, or may be a radio controller in a cloud radio access network (CRAN) scenario, or may be a relay node, an access point, a vehicle-mounted device, a wearable device, a network device in a future 5G network, a network device in a future evolved PLMN network, or the like. A specific technology used by and a specific device form of the radio access network device are not limited in this embodiment of this application.

The terminal device may also be referred to as a terminal, user equipment (UE), a mobile station (MS), a mobile terminal (MT), or the like. The terminal device may be a mobile phone, a tablet computer (Pad), a computer with a wireless transmitting/receiving function, a virtual reality VR terminal device, an augmented reality AR terminal device, a wireless terminal in industrial control, a wireless terminal in self-driving, a wireless terminal in remote surgery (remote medical surgery), a wireless terminal in a smart grid, a wireless terminal in transportation safety, a wireless terminal in a smart city, a wireless terminal in a smart home, a station (ST) in a WLAN, or the like.

For example, the core network device includes a mobility management entity (MME), a broadcast multicast service center (BMSC), or may include a corresponding function entity in a 5G system, for example, a core network control plane (CP) network function, a core network user plane (UP) network function, a session management network function (session management NF, SMF), an access and mobility management function (AMF), or the like. The core network control plane may also be understood as a core network control plane function (CPF) entity.

The radio access network device and the terminal device may be deployed on land and include an indoor or outdoor device, a handheld device, or a vehicle-mounted device, or may be deployed on the water, or may be deployed on an airplane, a balloon, or an artificial satellite in the air. Application scenarios of the radio access network device and the terminal device are not limited in this embodiment of this application.

This embodiment of this application is applicable to downlink signal transmission, or is applicable to uplink signal transmission, or is applicable to device-to-device (D2D) signal transmission. For the downlink signal transmission, a sending device is a radio access network device, and correspondingly a receiving device is a terminal device.

For the uplink signal transmission, a sending device is a terminal device, and correspondingly a receiving device is a radio access network device. For the D2D signal transmission, a sending device is a terminal device, and correspondingly a receiving device is also a terminal device. A signal transmission direction is not limited in this embodiment of this application.

Communication between the radio access network device and the terminal device and communication between the terminal devices may be performed by using a licensed spectrum, or may be performed by using an unlicensed spectrum, or may be performed by using both a licensed spectrum and an unlicensed spectrum. The communication between the radio access network device and the terminal device and the communication between the terminal devices may be performed by using a spectrum lower than 6 gigahertz (GHz), or may be performed by using a spectrum higher than 6 GHz, or may be performed by using both a spectrum lower than 6 GHz and a spectrum higher than 6 GHz. Spectrum resources used by the radio access network device and the terminal device are not limited in this embodiment of this application.

A method and an apparatus that are provided in the embodiments of this application may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a UNIX operating system, an Android operating system, an iOS operating system, or a Windows operating system. The application layer includes applications such as a browser, an address book, word processing software, and instant messaging software. In addition, in the embodiments of this application, a specific structure of an execution body of a data sending method is not specifically limited in the embodiments of this application, provided that communication can be performed according to the data sending method in the embodiments of this application by running a program recording code of the data sending method in the embodiments of this application. For example, the data sending method in the embodiments of this application may be performed by the terminal device, the network device, or a function module that is in the terminal device or the network device and that can invoke and execute the program.

In addition, aspects or features in the embodiments of this application may be implemented as a method, an apparatus, or a product that uses standard programming and/or engineering technologies. The term "product" used in the embodiments of this application covers a computer program that can be accessed from any computer readable device, carrier, or medium. For example, the computer readable medium may include but is not limited to a magnetic storage device (for example, a hard disk, a floppy disk, or a magnetic tape), an optical disc (for example, a compact disc (CD) or a digital versatile disc (DVD)), a smart card and a flash memory device (for example, an erasable programmable read-only memory (EPROM), a card, a stick, or a key drive). In addition, various storage media described in this specification may represent one or more devices and/or other machine readable media that are configured to store information. The term "machine readable media" may include but is not limited to a radio channel and various other media that can store, include, and/or carry an instruction and/or data.

In LTE, a network device broadcasts time information by using a system information block (SIB) 16, and all terminal devices can listen and obtain the time information. The network device cannot control a sending range of the time information. A solution attempts to be proposed in the embodiments of this application, so that the network device knows terminals for which a time synchronization service needs to be provided.

The following describes in detail a communication method in the embodiments of this application with reference to FIG. 2 to FIG. 7.

Figure 2:
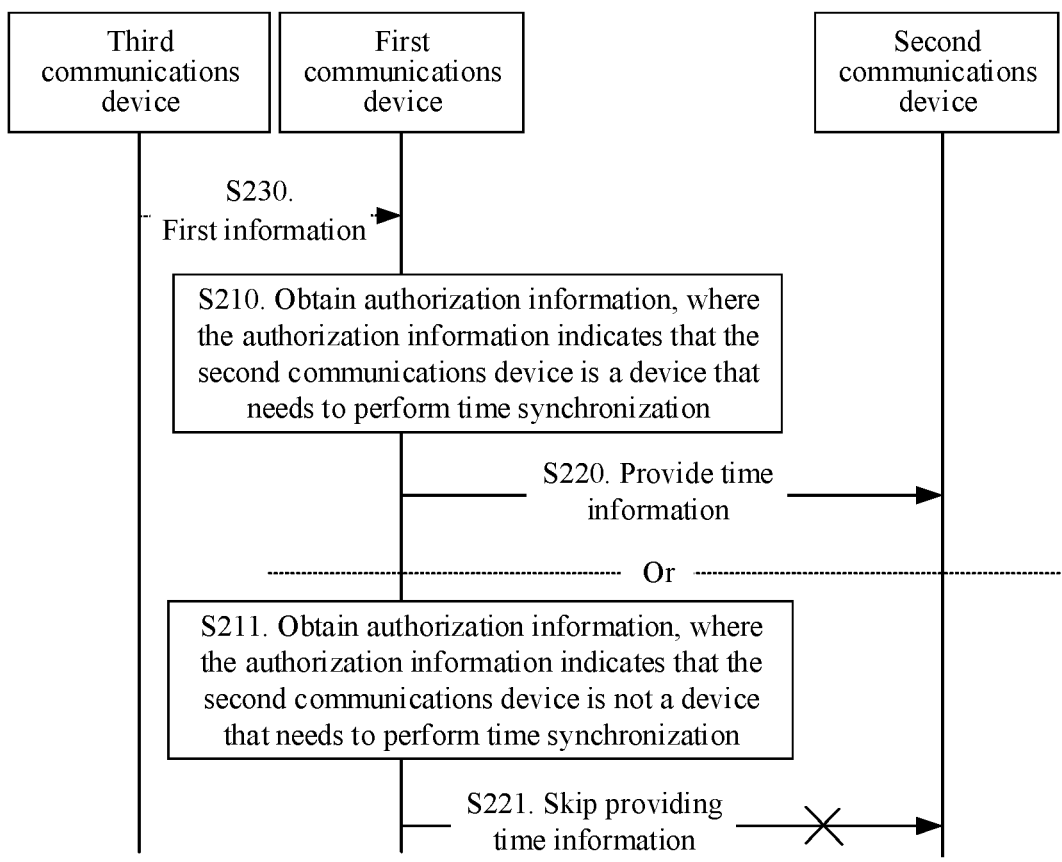
FIG. 2 is a schematic interaction diagram of a communication method according to an embodiment of this application.

FIG. 2 is a schematic interaction diagram of a communication method 200 according to an embodiment of this application. Optionally, in this embodiment of this application, a first communications device may be a radio access network device or node (for example, a base station (BS), a gNB, an eNB, a centralized unit (CU), or a distributed unit (DU)), and a second communications device may be a terminal device, UE, a D2D device, a BS, a gNB, an eNB, a CU, or a DU. For example, in the method 200, the first communications device may be the radio access network device 120 in FIG. 1, and the second communications device may be the terminal device (for example, the terminal device 130 or the terminal device 140 in FIG. 1) in FIG. 1. As shown in FIG. 2, the method 200 includes the following steps.

S210. The first communications device obtains authorization information, where the authorization information indicates that the second communications device is a device that needs to perform time synchronization.

It should be understood that in this embodiment of this application, the time synchronization may be time synchronization between a base station and a terminal, or may be time synchronization between terminals, or may be time synchronization between a terminal and a reference clock, or may be that a terminal needs to obtain time information provided by an access network device. This is not limited in this embodiment of this application.

Optionally, that the authorization information indicates that the second communications device is a device that needs to perform time synchronization specifically includes:

The authorization information carries first indication information and/or first time accuracy information, where the first indication information is used to indicate that the second communications device is the device that needs to perform the time synchronization, and the first time accuracy information is used to indicate accuracy required for the time synchronization. Herein, the accuracy required for the time synchronization may be replaced with a time granularity, a time unit, a time unit, or another description representing a minimum time unit. This is not limited. For example, the accuracy of the time synchronization may be a time order of magnitude, for example, 1 ms, 5 ms, 10 ms, 20 ms, or 500 ns. This is not limited.

To be specific, specific content carried in the authorization information includes the following three cases: (1) The authorization information carries the first indication information, to be specific, directly indicates, by using the first indication information, that the second communications device is the device that needs to perform the time synchronization. (2) The authorization information carries the first time accuracy information, and the first time accuracy information indicates the accuracy required by the second communications device for performing the time synchronization, to indirectly indicate that the second communications device is the device that needs to perform the time synchronization. (3) The authorization information carries the first indication information and the first time accuracy information, to be specific, indicates that the second communications device is the device that needs to perform the time synchronization, and further provides the accuracy required by the second communications device for performing the time synchronization.

S220. The first communications device provides time information for the second communications device based on the authorization information. Optionally, the time information is used by the second communications device to perform the time synchronization.

Optionally, that the first communications device provides time information for the second communications device based on the authorization information includes:

providing, by the first communications device based on the authorization information, the second communications device with a service of performing the time synchronization with a reference clock.

The reference clock may be a coordinated universal time (UTC) time, or a global positioning system (GPS) time, or a local time of a base station, or a local time of a device with which the second communications device needs to perform time synchronization. This is not limited. Optionally, the reference clock may also be another well-known time standard. This is not limited.

Optionally, that the second communications device performs the time synchronization with the reference clock may be that a moment corresponding to the second communications device is synchronized with a moment corresponding to the reference clock, or may be that the second communications device obtains time information of the reference clock. Optionally, the second communications device performs the time synchronization based on the time information. That a time of the second communications device is completely the same as a time of the reference clock is not limited in this embodiment of this application.

In other words, the time synchronization performed between the second communications device and the reference clock is not limited to time synchronization in a narrow sense, or may be synchronization in a broad sense. This is not limited in this embodiment of this application.

In other words, "synchronization with the reference clock" mentioned in this embodiment of this application may be understood as follows: The second communications device (for example, a terminal device) synchronizes a clock of the second communications device by using the reference clock; or the second communications device obtains only the time information that is of the reference clock and that is provided by the access network device.

Therefore, if the authorization information indicates that the second communications device is the device for which a time synchronization service needs to be provided, the first communications device provides, based on content indicated by the authorization information, the second communications device with the service of performing the time synchronization with the reference clock.

Alternatively, in step S211, the first communications device obtains authorization information, where the authorization information indicates that the second communications device is not a device that needs to perform time synchronization.

Optionally, that the authorization information indicates that the second communications device is not a device that needs to perform time synchronization specifically includes:

The authorization information carries second indication information and/or second time accuracy information, where the second indication information is used to indicate that the second communications device is not the device that needs to perform the time synchronization, and the second time accuracy information is used to indicate that accuracy required for the time synchronization is a preset value. The preset value herein is used to indicate that the time synchronization does not need to be performed. Optionally, the preset value may be 0, or may be an infinity value or an infinitesimal value. This is not limited.

To be specific, specific content carried in the authorization information includes the following three cases: (1) The authorization information carries the second indication information, to be specific, directly indicates, by using the second indication information, that the second communications device is not the device that needs to perform the time synchronization. (2) The authorization information carries the second time accuracy information, and the second time accuracy information indicates that the accuracy required by the second communications device for performing the time synchronization is the preset value, to indirectly indicate that the second communications device is not the device that needs to perform the time synchronization. (3) The authorization information carries the second indication information and the second time accuracy information, to be specific, indicates that the second communications device is not the device that needs to perform the time synchronization, and further provides that the accuracy required by the second communications device for performing the time synchronization is the preset value.

S221. The first communications device does not provide time information or a time synchronization service for the second communications device based on the authorization information. To be specific, if the authorization information indicates that the second communications device is not the device that needs to perform the time synchronization, the first communications device does not provide the time synchronization service for the second communications device regardless of whether the first communications device previously provides the time synchronization service for the second communications device.

In conclusion, if the authorization information indicates that the second communications device is the device for which the time synchronization service needs to be provided, the first communications device provides the second communications device with the service of performing the time synchronization with the reference clock. If the authorization information indicates that the second communications device is not the device for which the time synchronization service needs to be provided, the first communications device does not provide the time synchronization service for the second communications device, or the first communications device determines not to provide the time synchronization service for the second communications device. In other words, in this embodiment of this application, the first communications device controls a service range through unicast based on the authorization information. In this way, the first communications device can determine, by using the content indicated by the authorization information, a communications device for which the time synchronization service needs to be provided, to avoid broadcasting the time information to all communications devices, and help implement control, authorization, or charging of the communications device for which the time synchronization service needs to be provided.

It should be understood that the solution of steps S210 and S220 is parallel with the solution of steps S211 and S221, and an execution sequence is not limited in this embodiment of this application. To be specific, a solution specifically performed by the first communications device depends on specific content indicated by the authorization information, and numbers of the steps do not constitute a limitation on an implementation sequence of the solutions.

Optionally, step S220 includes:

The first communications device sends a time synchronization message to the second communications device, where the time synchronization message is used by the second communications device to obtain the time information. Optionally, the second communications device can implement the time synchronization based on the obtained time information.

Specifically, the first communications device can configure a related parameter and/or time synchronization information for the second communications device, so that the second communications device implements the time synchronization with the first communications device.

Optionally, the time synchronization message includes one or more of the following information: time information corresponding to the first time accuracy information, scrambling information used to decode the time information, key information used to decrypt the time information, timer information used to perform the time synchronization with the first communications device, a radio resource required for the time synchronization, and a reference signal required for the time synchronization. If the time information corresponding to the first time accuracy information indicates accuracy indicated by the first time accuracy information, the first communications device provides corresponding accuracy information for the second communications device. Herein, the accuracy information provided by the first communications device for the second communications device may be specific time accuracy, or may be an integer value (the second communications device may obtain time accuracy through calculation according to a calculation rule defined in a protocol). This is not limited in this embodiment of this application.

Therefore, the first communications device sends the time synchronization message to the second communications device, so that the second communications device can complete the time synchronization based on the time synchronization message.

Alternatively, if the authorization information indicates that the second communications device is not the device that needs to perform the time synchronization, the first communications device may also send the time synchronization message to the second communications device. A difference lies in that the time synchronization message includes information indicating that a request of the second communications device for performing the time synchronization is rejected. Therefore, the first communications device sends the time synchronization message to the second communications device, so that the second communications device can learn that the second communications device is not the device for which the time synchronization service is provided.

Optionally, the method 200 further includes:

The first communications device adds the authorization information to a context of the second communications device.

Specifically, the first communications device can store the authorization information in the context of the second communications device. Alternatively, if the first communications device has previously stored the authorization information, the first communications device updates the previously stored authorization information based on latest received authorization information. It should be understood that the first communications device can store the authorization information in the context of the second communications device regardless of specific content indicated by the authorization information.

In this embodiment of this application, the first communications device obtains the authorization information in a plurality of manners, for example, may obtain the authorization information from a third communications device. As shown in FIG. 2, optionally, in step S230, the third communications device sends first information to the first communications device. Correspondingly, the first communications device receives the first information. The first information may be authorization information, quality of service information, network slice information, or the like. Optionally, the first communications device may feed back a response message to the third communications device, where the response message indicates that the first communications device obtains the first information. It should be understood that an interaction procedure in which the third communications device sends the first information to the first communications device and the first communications device feeds back the response message to the third communications device may exist in a context establishment procedure, or may exist in a context resume procedure, or may exist in a path switch procedure initiated by a base station, or may exist in a handover procedure initiated by a core network, or may exist in a procedure of handover between a source gNB and a target gNB, or the like. This is not limited in this embodiment of this application.

The third communications device may be a core network device or a core network node, for example, an SMF node, an AMF node, or an MME, or may be a base station. This is not limited in this embodiment of this application.

The following further describes optional implementations.

In a first optional implementation, the third communications device sends the authorization information to the first communications device. For example, the core network node sends signaling to the first communications device through an Si interface, where the signaling directly carries the authorization information. For example, the authorization information is an information element (IE). For another example, the base station sends the signaling to the first communications device through an X2 interface.

Correspondingly, step S210 or S211 includes: The first communications device receives the authorization information sent by the third communications device. In other words, the first communications device can directly obtain the authorization information by receiving the signaling sent by the core network node or the base station.

Optionally, the authorization information may be included in a quality of service (Qos) parameter. For example, when reporting the quality of service parameter to the first communications device, the third communications device may add the authorization information to the quality of service parameter.

The following describes possible specific content of the IE with reference to Table 1. In Table 1, an example in which the first communications device is a base station and the second communications device is UE is used for description.

TABLE 1

| Information element name (IE/Group Name) | Presence (presence) feature | Information element type (IE type) | Semantics description (Semantics description) |
|---|---|---|---|
| Synchronization indication information | Optional (Optional, O) | Enumeration value (used to indicate whether authorization is supported) | Indicate that UE is a device that needs to perform time synchronization, or indicate that UE is not a device that needs to perform time synchronization |
| Accuracy indication of time synchronization | Optional | Enumeration value (used to indicate time accuracy) | Indicate a requirement of the UE for time accuracy, or time accuracy provided by a base station for the UE |
| Reliability indication | Optional | Enumeration value (used to indicate whether security assurance is supported) | Indicate that time information provided for the UE is reliable, or indicate that time information provided for the UE is unreliable |

It can be learned from Table 1 that the information element IE may include one or more of the synchronization indication information, the accuracy indication of the time synchronization, and the reliability indication. In Table 1, the first column represents the information element name, including the synchronization indication information, the accuracy indication of the time synchronization, and the reliability indication; the second column represents a specific presence feature, where O represents "optional"; the third column represents the information element type, where the information element type may be represented by the enumeration value; and the fourth column represents the semantics description of a corresponding information element. It should be understood that Table 1 describes only an example of content corresponding to the information element, and does not constitute a limitation on this embodiment of this application.

In addition, for the accuracy indication of the time synchronization, an enumeration value in the third column may be a specific time accuracy value, for example, accuracy of 1 millisecond (ms), 100 microseconds (μs), 10 μs, or 1 μs.

Alternatively, for the accuracy indication of the time synchronization, the enumeration value in the third column may be replaced with an integer value. For example, a value representing time accuracy may be any integer from 0 to 1023. In this case, a time unit needs to be specified in a protocol, for example, ms or μs. If the value is 500, it indicates that the UE requires time accuracy of 500 μs.

It should be understood that Table 1 shows only an example for description, and does not specifically limit the content included in the IE.

It should be further understood that in Table 1, an example in which a presence feature corresponding to the synchronization indication information, a presence feature corresponding to the accuracy indication of the time synchronization, and a presence feature corresponding to the reliability indication are all optional is used for description. In actual implementation, the presence feature corresponding to the synchronization indication information, the presence feature corresponding to the accuracy indication of the time synchronization, and the presence feature corresponding to the reliability indication may be mandatory, or some of the presence features may be optional and the other may be mandatory. This is not limited in this embodiment of this application.

Further, the content in Table 1 may be added to an existing protocol (refer to the protocol TS 36.413). In other words, as shown in Table 2, an IE in the existing protocol is expanded.

TABLE 2

| IE/Group name QoS parameter | Presence | Range Range | IE type and reference | Semantics description |
|---|---|---|---|---|
| >QCI (QoS class identifier) | M | | INTEGER (0 to 255) | |
| >Allocation and retention priority (Allocation and retention priority) | M | | | |
| >GBR QoS information (Guaranteed bit rate QoS information) | O | | | |
| Synchronization indication information | Optional | | Enumeration value (used to indicate whether authorization is supported) | Indicate that UE is a device that needs to perform time synchronization, or indicate that UE is not a device that |

TABLE 2-continued

| IE/Group name QoS parameter | Presence | Range Range | IE type and reference | Semantics description |
|---|---|---|---|---|
| | | | | needs to perform time synchronization |
| Accuracy indication of time synchronization | Optional | | Enumeration value (used to indicate time accuracy) | Indicate a requirement of the UE for time accuracy, or time accuracy provided by a base station for the UE |
| Reliability indication | Optional | | Enumeration value (used to indicate whether security assurance is supported) | Indicate that time information provided for the UE is reliable, or indicate that time information provided for the UE is unreliable |

In Table 2, mandatory M represents "mandatory", and O represents "optional". It should be understood that in Table 2, for a part that is not newly added content, reference may be made to explanations in the existing protocol. For brevity, details are not described herein. A focus of this embodiment of this application is that the authorization information may be explicitly carried in the IE. Therefore, a possible case in which the IE carries the authorization information is shown in Table 2. The authorization information may include one or more of the synchronization indication information, the accuracy indication of the time synchronization, and the reliability indication in Table 2.

It should be further understood that content in a blank part in Table 2 may be set based on a requirement or with reference to descriptions in the existing protocol TS 36.413. This is not limited in this embodiment of this application.

It should be further understood that for some terms or concepts used in Table 2, reference may be made to descriptions in the existing protocol TS 36.413. A person skilled in the art can learn of the terms or concepts. Details are not described herein.

Therefore, in this embodiment of this application, the first communications device may directly receive the authorization information sent by the third communications device, to learn of the content indicated by the authorization information.

In a second optional implementation, the method 200 further includes: The third communications device sends quality of service information to the first communications device. Correspondingly, the first communications device receives the quality of service information. For example, the core network node sends signaling to the first communications device through the Si interface, where the signaling directly carries the quality of service information. For another example, the base station sends the quality of service information to the first communications device through the X2 interface.

Step S210 or S211 includes: The first communications device determines the authorization information based on the quality of service information and a first correspondence, where the first correspondence is a correspondence between the quality of service information and the authorization information.

In other words, the first communications device can obtain the quality of service information by receiving the signaling sent by the core network node or the base station, and then obtain the authorization information based on the first correspondence.

Optionally, the quality of service information is some parameters or information that can reflect quality of service. The quality of service information specifically includes a quality of service QoS parameter. Further, the QoS parameter includes a QCI (QoS class identifier), a service class, a service category, an allocation and retention priority, guaranteed bit rate (GBR) QoS information, a latency, reliability, a packet loss rate, a jitter parameter, or the like.

The first correspondence may be configured by the core network node, may be predefined in the protocol, may be configured by another base station, or may be configured by operation administration and maintenance (O&M). This is not limited.

The following describes specific content corresponding to the QCI with reference to Table 3. It should be understood that for some terms or concepts (including specific content corresponding to each QCI type) used in Table 3, reference may be made to descriptions in the existing protocol TS 23.203. A person skilled in the art can learn of the terms or concepts. Details are not described herein.

TABLE 3

| QCI (number or type) | Resource type Resource type | Priority priority level | Packet delay budget Packet delay budget (NOTE 13) | Packet error loss rate Packet error loss rate (NOTE 2) | Example services Example services (or application scenarios) | Indication information (used to explicitly indicate whether time synchronization needs to be performed) |
|---|---|---|---|---|---|---|
| 1 (NOTE 3) | GBR | 2 | 100 ms (NOTE 1 and NOTE 11) | $10^{-2}$ | Conversational voice (Conversational voice) | Yes or no |

TABLE 3-continued

| QCI (number or type) | Resource type Resource type | Priority priority level | Packet delay budget Packet delay budget (NOTE 13) | Packet error loss rate Packet error loss rate (NOTE 2) | Example services Example services (or application scenarios) | Indication information (used to explicitly indicate whether time synchronization needs to be performed) |
|---|---|---|---|---|---|---|
| 2 (NOTE 3) | | 4 | 150 ms (NOTE 1 and NOTE 11) | $10^{-3}$ | Conversational video (Live Streaming) (conversational video; live streaming) | Yes or no |
| 3 (NOTE 3 and NOTE 14) | | 3 | 50 ms (NOTE 1 and NOTE 11) | $10^{-3}$ | Real time gaming and V2X messages (real time data and a V2X message) | Yes or no |
| 4 (NOTE 3) | | 5 | 300 ms (NOTE 1 and NOTE 11) | $10^{-6}$ | Non-conversational video (Buffered Streaming) (non-conversational video; buffered video streaming) | Yes or no |
| 65 (NOTE 3, NOTE 9, and NOTE 12) | | 0.7 | 75 ms (NOTE 7 and NOTE 8) | $10^{-2}$ | Mission critical user plane push to talk voice (eg., MCPTT) | Yes or no |
| 66 (NOTE 3 and NOTE 12) | | 2 | 100 ms (NOTE 1 and NOTE 10) | $10^{-2}$ | Non-mission-critical user plane push to talk voice | Yes or no |
| 75 (NOTE 14) | | 2.5 | 50 ms (NOTE 1) | $10^{-2}$ | V2X messages | Yes or no |
| 76 | Delay critical GBR | 2.7 | 20 ms | $10^{-2}$ | Similar to "process automation (process automation)" | Yes or no |
| 77 | | 2.7 | 1 ms | $10^{-5}$ | Factory automation (Industrial automation) | Yes or no |
| 78 | | 2.7 | 5 ms | $10^{-5}$ | Power grid sub-station (smart grid) | Yes or no |
| 80 | | 2.7 | 10 ms | $10^{-5}$ | Haptic remote control. Similar to "remote control (haptic remote control)" | Yes or no |
| 5 (NOTE 3) | Non-GBR | 1 | 100 ms (NOTE 1 and NOTE 10) | $10^{-6}$ | IMS signaling (IMS signaling) | Yes or no |
| 6 (NOTE 4) | | 6 | 300 ms (NOTE 1 and NOTE 10) | $10^{-6}$ | Video (Buffered Streaming) TCP-based (e.g., www, e-mail, chat, ftp, p2p file sharing, progressive video, etc.) | Yes or no |

TABLE 3-continued

| QCI (number or type) | Resource type Resource type | Priority priority level | Packet delay budget Packet delay budget (NOTE 13) | Packet error loss rate Packet error loss rate (NOTE 2) | Example services Example services (or application scenarios) | Indication information (used to explicitly indicate whether time synchronization needs to be performed) |
|---|---|---|---|---|---|---|
| 7 (NOTE 3) | | 7 | 100 ms (NOTE 1 and NOTE 10) | $10^{-3}$ | (video (buffered streaming) and TCP service) Voice, video (Live Streaming), and interactive gaming (Voice, video (live streaming), and interactive gaming) | Yes or no |
| 8 (NOTE 5) | | 8 | 300 ms (NOTE 1) | $10^{-6}$ | (Video and TCP service) Video (Buffered Streaming) TCP-based (e.g., www, e-mail, chat, ftp, and p2p file | Yes or no |

Table 3 includes a plurality of QCI types, and each QCI type corresponds to a resource type, a priority, a packet delay budget, a packet error loss rate, an example service, and indication information. QCIs 76 to 80 are QCIs defined for a URLLC service.

Specifically, after receiving a QCI type sent by the third communications device, the first communications device can obtain corresponding authorization information according to Table 3, to determine whether to provide a time synchronization service and time accuracy information for the second communications device. Specific content indicated by the authorization information corresponding to the QCI type may be indicated by the protocol. This is not limited in this embodiment of this application.

For example, the authorization information corresponding to the QCI type may indicate whether the first communications device provides the time synchronization service. Further, time accuracy may be predefined in the protocol. For example, QCIs 77 to 80 indicate that the time synchronization service may be provided for the second communications device. Specifically, the time accuracy may be determined by the first communications device, or the accuracy predefined in the protocol is 1 μs.

For example, the authorization information corresponding to the QCI type may indicate the accuracy of the time synchronization. For example, the QCI 77 corresponds to a requirement for time accuracy of 1 μs, and the QCI 78 corresponds to a requirement for time accuracy of 10 μs.

For example, the authorization information corresponding to the QCI type may indicate the accuracy that is of the time synchronization and that needs to be provided by the first communications device. For example, the QCI 77 indicates that the base station needs to provide a requirement for time accuracy of 1 μs for the UE, and the QCI 78 indicates that the base station needs to provide a requirement for time accuracy of 10 μs for the UE.

Optionally, each column in Table 3 may be used to represent the authorization information. In other words, the first communications device may obtain the authorization information based on content in any column. Further, the last column in Table 3 may be newly added indication information, and the indication information may explicitly indicate the authorization information.

In a third optional implementation, the method 200 further includes: The third communications device sends network slice information to the first communications device. Correspondingly, the first communications device receives the network slice information. For example, the core network node sends signaling to the first communications device through the S1 interface, where the signaling directly carries the network slice information. For another example, the base station sends the network slice information to the first communications device through the X2 interface.

Step S210 or S211 includes: The first communications device determines the authorization information based on the network slice information and a second correspondence, where the second correspondence is a correspondence between the network slice information and the authorization information.

In other words, the first communications device may obtain the network slice information by receiving the signaling sent by the core network node or the base station, and then obtain the authorization information based on the second correspondence.

Optionally, the network slice information includes at least one of a slice identifier, a slice type, network slice selection assistance information, and the like. For example, the network slice information may be the network slice selection assistance information (NSSAI), and the NSSAI includes single network slice selection assistance information (S-NSSAI).

Specifically, there is a corresponding network slice when the second communications device accesses or registers with a network. After receiving the network slice information sent by the third communications device, the first communications device may know, with reference to the second correspondence, whether the second communications device is the device for which the time synchronization needs to be provided. For example, the first communications device knows, based on whether the second communications device supports a network slice type, whether the second communications device is the device for which the time synchronization service needs to be provided.

It should be understood that the second correspondence may be configured by the core network node, may be predefined in the protocol, may be configured by another base station, or may be configured by O&M. This is not limited.

The following describes, with reference to Table 4, specific content corresponding to a network slice.

TABLE 4

| Network slice type | Service type supported by a network slice | Latency requirement | Indication information (used to explicitly indicate whether time synchronization needs to be performed) |
|---|---|---|---|
| NSSAI A | URLLC service | 0.5 ms | Yes or no |
| NSSAI B | eMBB service | 4 ms | Yes or no |
| NSSAI C | V2X service | 3-10 ms | Yes or no |

Table 4 includes a plurality of network slice types. A different network slice type corresponds to a service type, a latency requirement, and indication information. Optionally, the indication information in Table 4 may explicitly indicate whether the second communications device needs to perform the time synchronization.

If the first communications device receives a network slice type sent by the third communications device, the first communications device may obtain corresponding authorization information based on the second correspondence. The first communications device may obtain, according to Table 4, information corresponding to the network slice type, and provide time accuracy information for the second communications device. Then, the first communications device may determine, based on a network slice used by the second communications device, whether to provide the time synchronization service and the time accuracy information for the network slice.

Therefore, the first communications device may obtain the authorization information based on the second correspondence and the network slice information by receiving the network slice information sent by the third communications device.

In this embodiment of this application, the first communications device may receive, in different message procedures, the authorization information sent by the second communications device. Descriptions are provided below by using an example.

Figure 3:
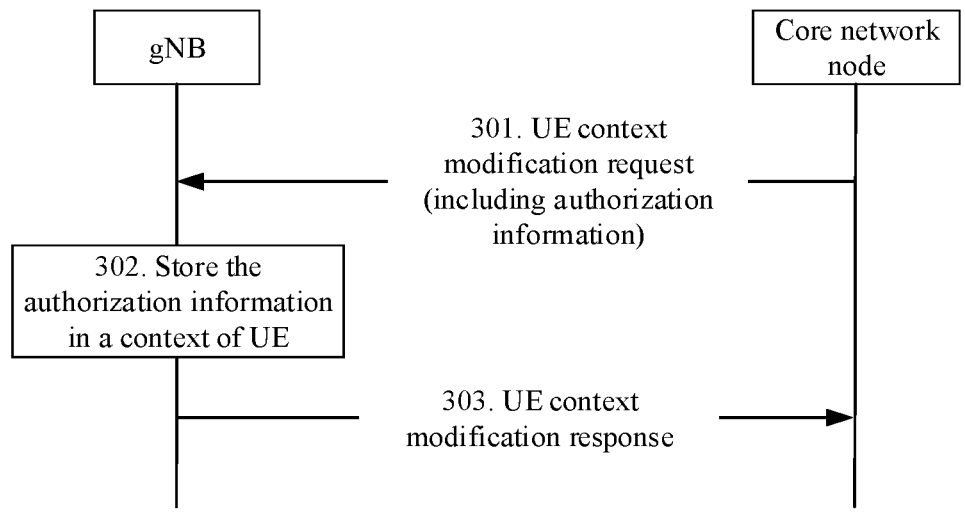
FIG. 3 is a schematic diagram of an example of obtaining authorization information.

FIG. 3 is a schematic diagram of an example of obtaining authorization information. In FIG. 3, a gNB is the first communications device, and a core network node is the third communications device.

301. The core network node sends a UE context modification request to the gNB, where the UE context modification request includes authorization information. Correspondingly, the gNB receives the UE context modification request.

302. The gNB stores the authorization information in a context of UE.

303. The gNB sends a UE context modification response to the core network node, where the UE context modification response indicates that the gNB receives the UE context modification request. Correspondingly, the core network node receives the UE context modification response.

In this example, the gNB may obtain the authorization information in a context modification procedure.

Figure 4:
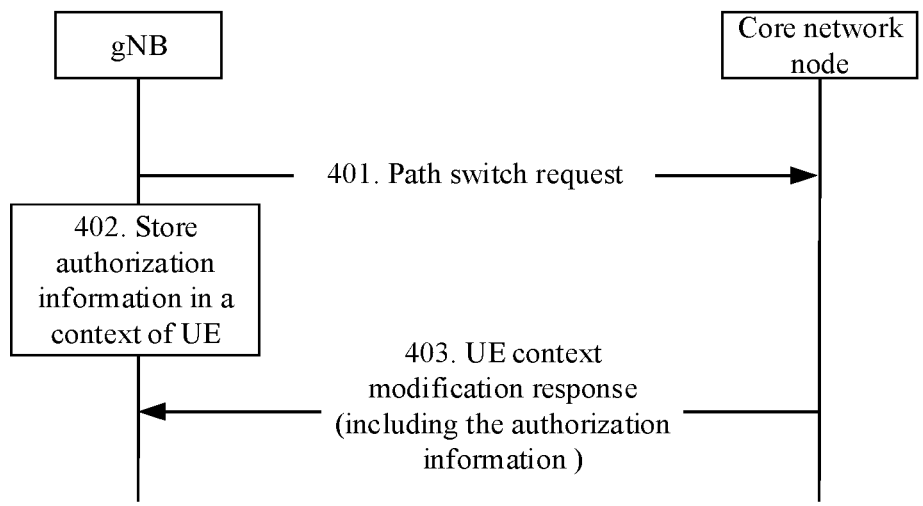
FIG. 4 is a schematic diagram of another example of obtaining authorization information.

FIG. 4 is a schematic diagram of another example of obtaining authorization information. In FIG. 4, a gNB is the first communications device, and a core network node is the third communications device.

401. The gNB sends a path switch request to the core network node. Correspondingly, the core network node receives the path switch request.

402. The gNB stores authorization information in a context of UE.

403. The core network node sends a UE context modification response to the gNB, where the UE context modification response includes the authorization information. Correspondingly, the gNB receives the UE context modification response.

In this example, the gNB may obtain the authorization information by initiating a path path procedure.

Figure 5:
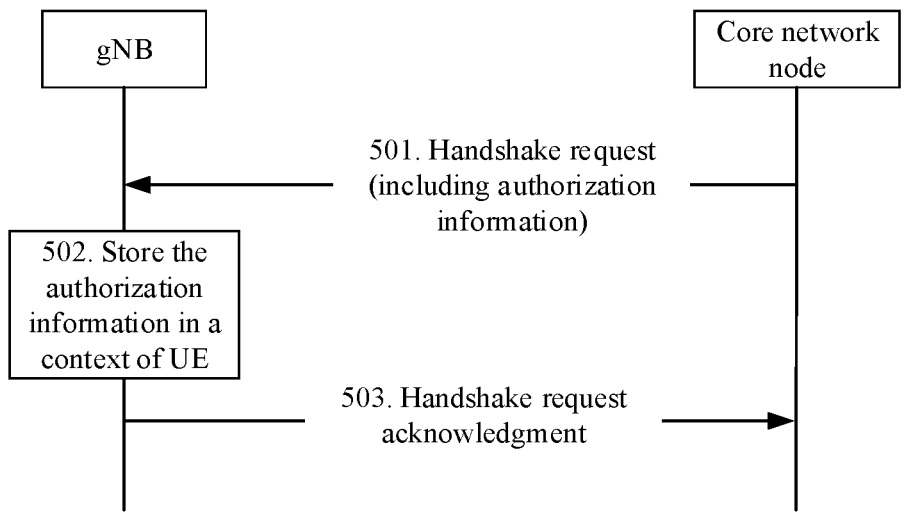
FIG. 5 is a schematic diagram of still another example of obtaining authorization information.

FIG. 5 is a schematic diagram of still another example of obtaining authorization information. In FIG. 5, a gNB is the first communications device, and a core network node is the third communications device.

501. The core network node sends a handshake request (handover request) to the gNB, where the handshake request includes authorization information. Correspondingly, the gNB receives the handshake request.

502. The gNB stores the authorization information in a context of UE.

503. The gNB sends a handshake request acknowledgment (handover request acknowledge) to the core network node. Correspondingly, the core network node receives the handshake request acknowledgment.

In this example, the gNB may obtain the authorization information in a path procedure initiated by the core network node.

Figure 6:
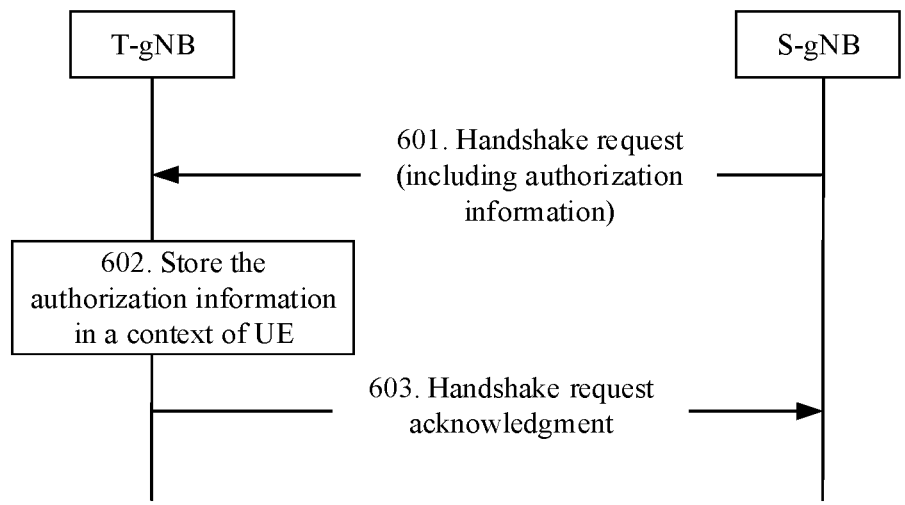
FIG. 6 is a schematic diagram of another example of obtaining authorization information.

FIG. 6 is a schematic diagram of another example of obtaining authorization information. In FIG. 6, a target gNB (T-gNB) is the first communications device, and a source gNB (S-gNB) is the third communications device.

601. The S-gNB sends a handshake request (handover request) to the T-gNB, where the handshake request includes authorization information. Correspondingly, the T-gNB receives the handshake request.

602. The T-gNB stores the authorization information in a context of UE.

603. The T-gNB sends a handshake request acknowledgment (handover request acknowledge) to the S-gNB. Correspondingly, the S-gNB receives the handshake request acknowledgment.

In this example, the T-gNB may obtain the authorization information in a path procedure initiated by the S-gNB.

Figure 7:
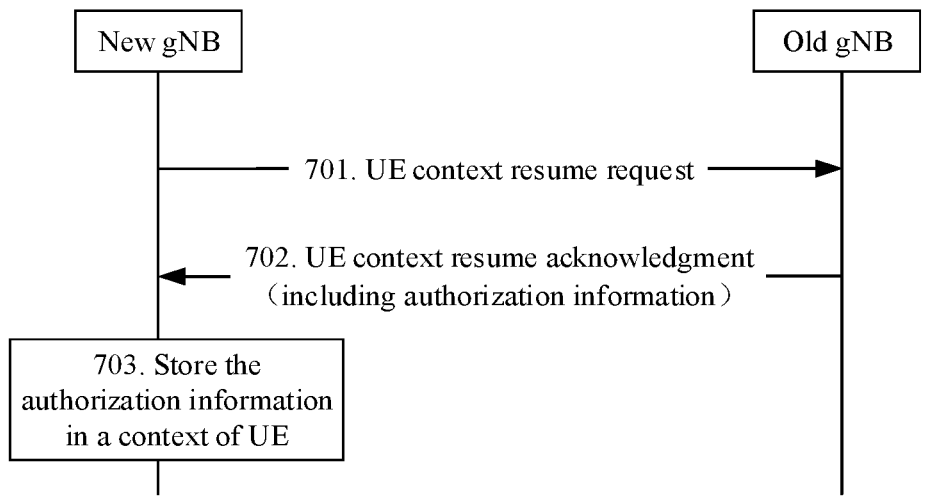
FIG. 7 is a schematic diagram of still another example of obtaining authorization information.

FIG. 7 is a schematic diagram of still another example of obtaining authorization information. In FIG. 7, a new gNB is the first communications device, and an old gNB is the third communications device.

701. The new gNB sends a UE context resume request (retrieve UE context request) to the old gNB. Correspondingly, the old gNB receives the UE context resume request.

702. The old NB sends a UE context resume request acknowledgment (retrieve UE context request acknowledge) to the new gNB, where the handshake request acknowledgment includes authorization information. Correspondingly, the new gNB receives the UE context resume request acknowledgment.

703. The new gNB stores the authorization information in a context of UE.

In this example, the new gNB may obtain the authorization information by initiating a context resume procedure.

It should be understood that the procedures in FIG. 3 to FIG. 7 are merely used as examples for description herein, and do not constitute a limitation on a manner of obtaining the authorization information in this embodiment of this application. In actual implementation, the authorization information may also be obtained in another possible procedure. This is not specifically limited in this embodiment of this application.

It should be further understood that the examples in FIG. 3 to FIG. 7 are merely intended to help a person skilled in the art understand this embodiment of this application, instead of limiting this embodiment of this application to a specific scenario shown in the examples. A person skilled in the art can apparently make various equivalent modifications or changes based on the examples in FIG. 3 to FIG. 7, and such modifications or changes also fall within the scope of this embodiment of this application.

This application further provides another communication method. Currently, abilities such as computing, storage, exchange, timing, and positioning of a radio access network are constantly improving. In addition, a service also has a higher requirement for a lower end-to-end latency and lower bandwidth. A terminal, a base station, and a core network jointly participate in service data transmission of an existing typical service. Consequently, a latency is high and bandwidth is high especially due to service data transmission between the core network and the base station. A method for directly providing a service or terminating a service by a radio access network node can be implemented in this embodiment of this application may implement. To be specific, service data is no longer transmitted by using the core network. In this way, a latency can be effectively reduced, and bandwidth occupied in a transmission network between the base station and the core network can be reduced. In addition, in this embodiment of this application, an authorization function is retained on a core network control plane, and a granularity of authorization is refined, to keep unified management control. The communication method includes:

obtaining, by the radio access network node, authorization information for a first service of the terminal from a core network control plane node or a neighboring radio access network node (where the authorization information may be used to instruct to perform authorization on the first service of the terminal, or the authorization information may be used to instruct not to perform authorization on the first service of the terminal); and if authorization is performed (to be specific, the authorization information is used to instruct to perform authorization on the first service of the terminal), in a downlink direction, generating, by an access stratum (AS stratum) of the radio access network node, service data of the first service, and sending the service data to the terminal; or if authorization is performed, in an uplink direction, after receiving service data that is of the first service and that is sent by the terminal, terminating, by an access stratum (AS stratum) of the radio access network node, transmission of the packet; or if authorization is not performed (to be specific, the authorization information is used to instruct not to perform authorization on the first service of the terminal), prohibiting, by an access stratum of the radio access network node, from providing the first service for the terminal; or if authorization is not performed, refusing, by an access stratum of the radio access network node, to provide the first service for the terminal; or if authorization is not performed, generating, by an access stratum of the radio access network node, an indication for refusing to provide the first service, and sending the indication to the terminal (in this case, the radio access network node can receive a service request of the terminal before sending the indication to the terminal).

In this newly proposed communication method, the core network node can separately perform authorization on a plurality of services of the terminal. However, existing authorization is usually performed at a granularity of the terminal. In other words, the core network control plane node performs authorization on each terminal without considering a service of the terminal. In the communication method proposed in this embodiment of this application, a granularity is finer, and authorization can be separately performed on the plurality of services of the terminal, to provide a more flexible management method.

In addition, V2X authorization and relay authorization exist in the prior art. However, these services are not terminated on the radio access network node. In the communication method proposed in this embodiment of this application, a service is directly provided by the radio access network node, and the service is terminated between the terminal and the radio access network node, so that the radio access network node can determine, based on authorization performed by the core network on the service of the terminal, whether to provide the service for the terminal.

Optionally, the foregoing AS stratum is a layer between the terminal and the radio access network node, and includes L1/L2/L3. Specifically, the AS stratum includes protocol layers such as a radio resource control (RRC) layer, a service data adaptation protocol (SDAP) layer, a packet data convergence protocol (PDCP) layer, a radio link layer control protocol (RLC) layer, a media access control (MAC) layer, and a physical (PHY) layer.

In an optional implementation, a protocol layer at which the first service is carried ends at the access stratum (AS stratum) between the radio access network node and the terminal.

Optionally, the first service includes one or more of the following: time serving, positioning, voice, video, a V2V service, a V2X service, a latency sensitive service (time sensitive service), a bandwidth service, and a local exchange service.

The foregoing describes in detail the communication methods according to the embodiments of this application with reference to FIG. 1 to FIG. 7. The following describes communications devices according to embodiments of this application with reference to FIG. 8 to FIG. 15. It should be understood that the technical features described in the method embodiments are also applicable to the following apparatus embodiments.

Figure 8:
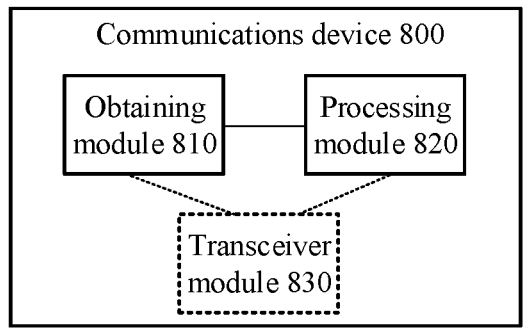
FIG. 8 is a schematic block diagram of a communications device according to an embodiment of this application.

FIG. 8 is a schematic block diagram of a communications device 800 according to an embodiment of this application. As shown in FIG. 8, the communications device 800 includes:

an obtaining module 810, configured to obtain authorization information, where the authorization information indicates that a second communications device is a device that needs to perform time synchronization; and a processing module 820, configured to provide time information for the second communications device based on the authorization information, where optionally, the time information is used by the second communications device to perform time synchronization (specifically, the first communications device provides, based on the authorization information, the second communications device with a service of performing the time synchronization with a reference clock); or the obtaining module 810, configured to obtain authorization information, where the authorization information indicates that the second communications device is not a device that needs to perform time synchronization; and the processing module 820, configured to skip providing time information for the second communications device based on the authorization information.

Optionally, that the authorization information indicates that a second communications device is a device that needs to perform time synchronization specifically includes that the authorization information carries first indication information and/or first time accuracy information, where the first indication information is used to indicate that the second communications device is the device that needs to perform the time synchronization, and the first time accuracy information is used to indicate accuracy required for the time synchronization; or that the authorization information indicates that the second communications device is not a device that needs to perform time synchronization specifically includes that the authorization information carries second indication information and/or second time accuracy information, where the second indication information is used to indicate that the second communications device is not the device that needs to perform the time synchronization, and the second time accuracy information is used to indicate that accuracy required for the time synchronization is a preset value.

Optionally, the processing module 820 is further configured to:

add the authorization information to a context of the second communications device.

Optionally, the obtaining module 810 is specifically configured to:

receive the authorization information sent by a third communications device.

Optionally, the communications device 800 further includes:

a transceiver module 830, configured to receive quality of service information sent by a third communications device.

The obtaining module 810 is specifically configured to:

determine the authorization information based on the quality of service information and a first correspondence, where the first correspondence is a correspondence between the quality of service information and the authorization information.

Optionally, the communications device 800 further includes:

a transceiver module 830, configured to receive network slice information sent by a third communications device.

The obtaining module 810 is specifically configured to:

determine the authorization information based on the network slice information and a second correspondence, where the second correspondence is a correspondence between the network slice information and the authorization information.

Optionally, the processing module 820 is specifically configured to:

send a time synchronization message to the second communications device by using the transceiver module 830, where the time synchronization message is used by the second communications device to obtain the time information.

Optionally, the time synchronization message includes one or more of the following information: time information corresponding to the first time accuracy information, scrambling information used to decode the time information, key information used to decrypt the time information, timer information used to perform the time synchronization with the first communications device, a radio resource required for the time synchronization, and a reference signal required for the time synchronization; or the time synchronization message includes information indicating that a request of the second communications device for performing the time synchronization is rejected.

It should be understood that the communications device 800 according to this embodiment of this application may correspond to the method on the first communications device side in the foregoing method embodiments, and the foregoing and other management operations and/or functions of the modules of the communications device 800 are separately used to implement corresponding steps in the foregoing methods. Therefore, beneficial effects in the foregoing method embodiments can also be implemented. For brevity, details are not described herein again.

Figure 9:
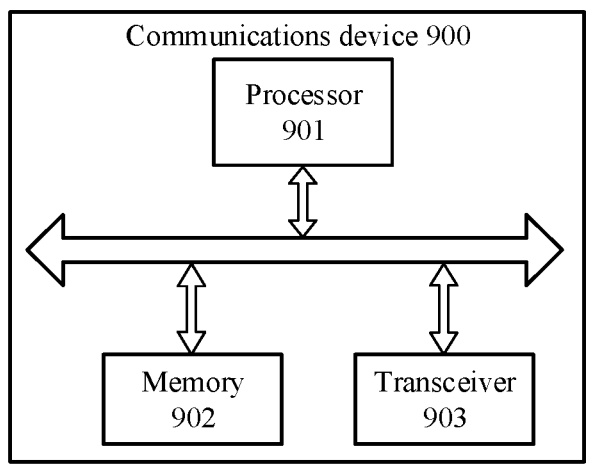
FIG. 9 is a schematic structural diagram of a communications device according to an embodiment of this application.

FIG. 9 is a schematic structural diagram of a communications device 900 according to an embodiment of this application. As shown in FIG. 9, the communications device 900 includes:

a processor 901, a memory 902, and a transceiver 903.

The processor 901, the memory 902, and the transceiver 903 communicate with each other through an internal connection path, to transmit a control and/or data signal. In a possible design, the processor 901, the memory 902, and the transceiver 903 may be implemented by using a chip. The memory 902 may store program code, and the processor 901 invokes the program code stored in the memory 902 to implement a corresponding function of the communications device.

The transceiver 903 is configured to obtain authorization information, where the authorization information indicates that a second communications device is a device that needs to perform time synchronization; and the processor 901 is configured to provide, based on the authorization information, the second communications device with a service of performing the time synchronization with a reference clock.

Alternatively, the transceiver 903 is configured to obtain authorization information, where the authorization information indicates that the second communications device is not a device that needs to perform time synchronization; and the processor 901 is configured to skip providing a time synchronization service for the second communications device based on the authorization information.

Optionally, the processor 901 is further configured to: add the authorization information to a context of the second communications device; or add the authorization information to a context of the second communications device by using the memory 902.

In a possible implementation, the transceiver 903 is specifically configured to receive the authorization information sent by a third communications device.

In a possible implementation, the transceiver 903 is specifically configured to receive quality of service information sent by a third communications device. The processor 901 is specifically configured to determine the authorization information based on the quality of service information and a first correspondence, where the first correspondence is a correspondence between the quality of service information and the authorization information.

In a possible implementation, the transceiver 903 is specifically configured to receive network slice information sent by a third communications device. The processor 901 is specifically configured to determine the authorization information based on the network slice information and a second correspondence, where the second correspondence is a correspondence between the network slice information and the authorization information.

Optionally, the obtaining module 810 and the transceiver module 830 of the communications device 800 shown in FIG. 8 may correspond to the transceiver 903 of the communications device 900 shown in FIG. 9, and the processing module may correspond to the processor 901 of the communications device 900 shown in FIG. 9. In another implementation, the transceiver 903 may be divided into both a receiver and a transmitter for implementation.

In this embodiment of this application, the communications device 800 may be a chip (or a chip system) installed in a communications device. In this case, the communications device 800 may include a processor and an input/output interface. The processor may be communicatively connected to a transceiver of a core network device or a network device through the input/output interface. Optionally, the communications device 800 further includes a memory, and the memory is communicatively connected to the processor. Optionally, the processor, the memory, and the transceiver may be communicatively connected to each other, the memory may be configured to store an instruction, and the processor is configured to execute the instruction stored in the memory, to control the transceiver to send information or a signal.

Figure 10:
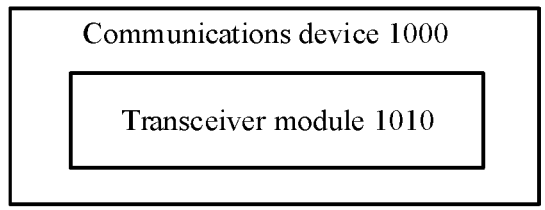
FIG. 10 is a schematic block diagram of a communications device according to another embodiment of this application.

FIG. 10 is a schematic block diagram of a communications device 1000 according to an embodiment of this application. As shown in FIG. 10, the communications device 1000 includes:

a transceiver module 1010, configured to send first information to a first communications device, where the first information is used by the first communications device to obtain authorization information, and the authorization information indicates that a second communications device is a device that needs to perform time synchronization, or the authorization information indicates that the second communications device is not a device that needs to perform time synchronization.

The transceiver module 1010 is further configured to receive a response message sent by the first communications device, where the response message indicates that the first communications device obtains the first information.

Optionally, that the authorization information indicates that a second communications device is a device that needs to perform time synchronization specifically includes that the authorization information carries first indication information and/or first time accuracy information, where the first indication information is used to indicate that the second communications device is the device that needs to perform the time synchronization, and the time accuracy information is used to indicate accuracy required for the time synchronization; or that the authorization information indicates that the second communications device is not a device that needs to perform time synchronization specifically includes that the authorization information carries second indication information and/or second time accuracy information, where the second indication information is used to indicate that the second communications device is not the device that needs to perform the time synchronization, and the second time accuracy information is used to indicate that accuracy required for the time synchronization is a preset value.

Optionally, the first information is the authorization information.

Optionally, the transceiver module 1010 is specifically configured to:

send quality of service information to the first communications device, where the quality of service information of the first service is used by the first communications device to determine the authorization information based on a first correspondence, and the first correspondence is a correspondence between the quality of service information and the authorization information.

Optionally, the transceiver module 1010 is specifically configured to:

send network slice information to the first communications device, where the network slice information is used by the first communications device to determine the authorization information based on a second correspondence, and the second correspondence is a correspondence between the network slice information and the authorization information.

It should be understood that the communications device 1000 according to this embodiment of this application may correspond to the method on the third communications device side in the foregoing method embodiments, and the foregoing and other management operations and/or functions of the module of the communications device 1000 are separately used to implement corresponding steps in the foregoing methods. Therefore, beneficial effects in the foregoing method embodiments can also be implemented. For brevity, details are not described herein again.

Figure 11:
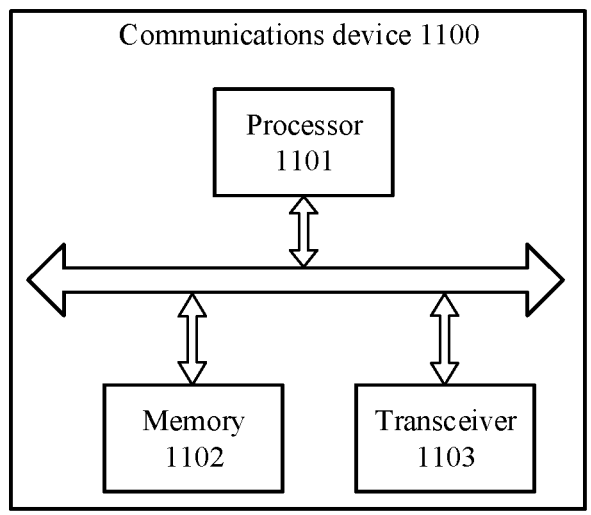
FIG. 11 is a schematic structural diagram of a communications device according to another embodiment of this application.

FIG. 11 is a schematic structural diagram of a terminal device 1100 according to an embodiment of this application. As shown in FIG. 11, the terminal device 1100 includes:

a processor 1101, a memory 1102, and a transceiver 1103.

The processor 1101, the memory 1102, and the transceiver 1103 communicate with each other through an internal connection path, to transmit a control and/or data signal. In a possible design, the processor 1101, the memory 1102, and the transceiver 1103 may be implemented by using a chip. The memory 1102 may store program code, and the processor 1101 invokes the program code stored in the memory 1102 to implement a corresponding function of the communications device.

The transceiver 1103 is configured to send first information to a first communications device, where the first information is used by the first communications device to obtain authorization information, and the authorization information indicates that a second communications device is a device that needs to perform time synchronization, or the authorization information indicates that the second communications device is not a device that needs to perform time synchronization.

In an optional implementation, the transceiver 1103 is specifically configured to directly send the authorization information to the first communications device.

In an optional implementation, the transceiver 1103 is specifically configured to send quality of service information to the first communications device, where the quality of service information of the first service is used by the first communications device to determine the authorization information based on a first correspondence, and the first correspondence is a correspondence between the quality of service information and the authorization information.

In an optional implementation, the transceiver 1103 is specifically configured to send network slice information to the first communications device, where the network slice information is used by the first communications device to determine the authorization information based on a second correspondence, and the second correspondence is a correspondence between the network slice information and the authorization information.

Optionally, the transceiver module 1010 of the communications device 1000 shown in FIG. 10 may correspond to the transceiver 1103 of the communications device 1100 shown in FIG. 11. In another implementation, the transceiver 1103 may be divided into both a receiver and a transmitter for implementation.

In this embodiment of this application, the communications device 1000 may be a chip (or a chip system) installed in a communications device. In this case, the communications device 1000 may include a processor and an input/output interface. The processor may be communicatively connected to a transceiver of a network device through the input/output interface. Optionally, the communications device 1000 further includes a memory, and the memory is communicatively connected to the processor. Optionally, the processor, the memory, and the transceiver may be communicatively connected to each other, the memory may be configured to store an instruction, and the processor is configured to execute the instruction stored in the memory, to control the transceiver to send information or a signal.

Figure 12:
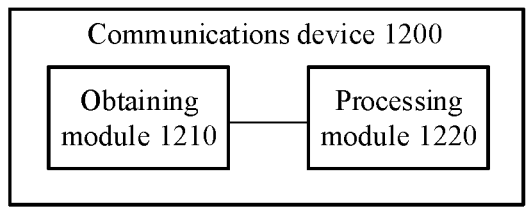
FIG. 12 is a schematic block diagram of a communications device according to still another embodiment of this application.

FIG. 12 is a schematic block diagram of a communications device 1200 according to an embodiment of this application. As shown in FIG. 12, the communications device 1200 includes:

an obtaining module 1210, configured to obtain time information provided by a first communications device (specifically, the second communications device obtains a service that is of performing time synchronization with a reference clock and that is provided by the first communications device); and a processing module 1220, configured to perform the time synchronization based on the time information.

Optionally, the obtaining module 1210 is specifically configured to:

receive a time synchronization message from the first communications device, where the time synchronization message is used by the second communications device to obtain time synchronization information.

Optionally, the time synchronization message includes one or more of the following information: time information corresponding to the first time accuracy information, scrambling information used to decode the time information, key information used to decrypt the time information, timer information used to perform the time synchronization with the first communications device, a radio resource required for the time synchronization, and a reference signal required for the time synchronization; or the time synchronization message includes information indicating that a request of the second communications device for performing the time synchronization is rejected.

It should be understood that the communications device 1200 according to this embodiment of this application may correspond to the method on the second communications device side in the foregoing method embodiments, and the foregoing and other management operations and/or functions of the modules of the communications device 1200 are separately used to implement corresponding steps in the foregoing methods. Therefore, beneficial effects in the foregoing method embodiments can also be implemented. For brevity, details are not described herein again.

Figure 13:
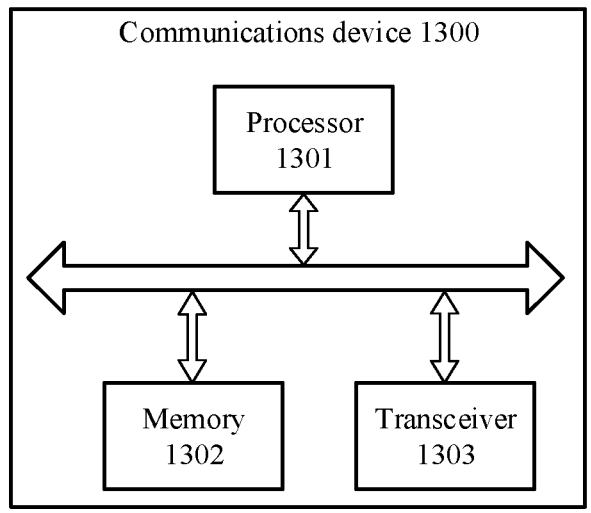
FIG. 13 is a schematic structural diagram of a communications device according to still another embodiment of this application.

FIG. 13 is a schematic structural diagram of a communications device 1300 according to an embodiment of this application. As shown in FIG. 13, the communications device 1300 includes:

a processor 1301, a memory 1302, and a transceiver 1303.

The processor 1301, the memory 1302, and the transceiver 1303 communicate with each other through an internal connection path, to transmit a control and/or data signal. In a possible design, the processor 1301, the memory 1302, and the transceiver 1303 may be implemented by using a chip. The memory 1302 may store program code, and the processor 1301 invokes the program code stored in the memory 1302 to implement a corresponding function of the communications device.

The transceiver 1303 is configured to obtain a service that is of performing time synchronization with a reference clock and that is provided by a first communications device.

The processor 1301 is configured to perform the time synchronization based on the service of performing the time synchronization.

Optionally, the transceiver 1303 is specifically configured to receive a time synchronization message from the first communications device, where the time synchronization message is used by the second communications device to obtain time synchronization information.

Optionally, the obtaining module 1210 of the communications device 1200 shown in FIG. 12 may correspond to the transceiver 1303 of the communications device 1300 shown in FIG. 13, and the processing module 1220 may correspond to the processor 1301 of the communications device 1300 shown in FIG. 13. In another implementation, the transceiver 1303 may be divided into both a receiver and a transmitter for implementation.

In this embodiment of this application, the communications device 1200 may be a chip (or a chip system) installed in a communications device. In this case, the communications device 1200 may include a processor and an input/output interface. The processor may be communicatively connected to a transceiver of a core network device or a network device through the input/output interface. Optionally, the communications device 1200 further includes a memory, and the memory is communicatively connected to the processor. Optionally, the processor, the memory, and the transceiver may be communicatively connected to each other, the memory may be configured to store an instruction, and the processor is configured to execute the instruction stored in the memory, to control the transceiver to send information or a signal.

Figure 14:
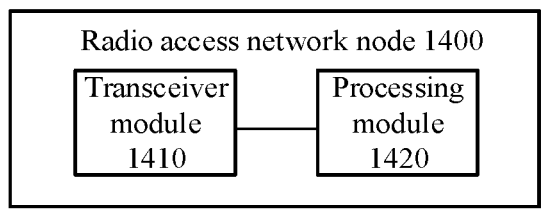
FIG. 14 is a schematic block diagram of a radio access network node according to another embodiment of this application.

FIG. 14 is a schematic block diagram of a radio access network node 1400 according to an embodiment of this application. As shown in FIG. 14, the radio access network node 1400 includes:

a transceiver module 1410, configured to obtain authorization information for a first service of a terminal from a core network control plane node or a neighboring radio access network node; and a processing module 1420, configured to perform any one of the following:

if authorization is performed, in a downlink direction, generating, by an access stratum (AS stratum) of the radio access network node, service data of the first service, and sending the service data to the terminal; or if authorization is performed, in an uplink direction, after receiving service data that is of the first service and that is sent by the terminal, terminating, by an access stratum of the radio access network node, transmission of the packet; or if authorization is not performed, prohibiting, by an access stratum of the radio access network node, from providing the first service for the terminal; or if authorization is not performed, refusing, by an access stratum of the radio access network node, to provide the first service for the terminal; or if authorization is not performed, generating, by an access stratum of the radio access network node, an indication for refusing to provide the first service, and sending the indication to the terminal (in this case, the radio access network node can receive a service request of the terminal before sending the indication to the terminal).

In this embodiment of this application, the radio access network node 1400 obtains the authorization information provided by the core network node for the first service of the terminal, to perform management at a finer granularity, and provide a more flexible management method.

It should be understood that the foregoing and other management operations and/or functions of the modules of the radio access network node 1400 are separately used to implement corresponding steps in the foregoing communication methods. Therefore, beneficial effects in the foregoing method embodiments can also be implemented. For brevity, details are not described herein again.

Figure 15:
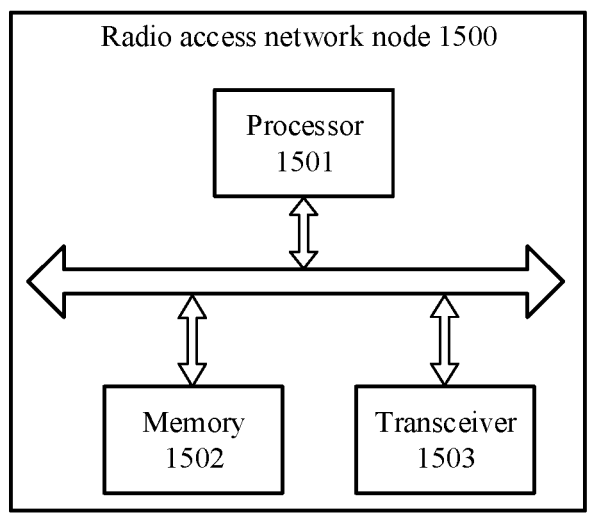
FIG. 15 is a schematic structural diagram of a radio access network node according to another embodiment of this application.

FIG. 15 is a schematic structural diagram of a radio access network node 1500 according to an embodiment of this application. As shown in FIG. 15, the radio access network node 1500 includes:

a processor 1501, a memory 1502, and a transceiver 1503.

The processor 1501, the memory 1502, and the transceiver 1503 communicate with each other through an internal connection path, to transmit a control and/or data signal. In a possible design, the processor 1501, the memory 1502, and the transceiver 1503 may be implemented by using a chip. The memory 1502 may store program code, and the processor 1501 invokes the program code stored in the memory 1502 to implement a corresponding function of the communications device.

The transceiver 1503 is configured to obtain authorization information for a first service of a terminal from a core network control plane node or a neighboring radio access network node.

The processor 1501 is configured to perform any one of the following:

if authorization is performed, in a downlink direction, generating, by an access stratum of the radio access network node, service data of the first service, and sending the service data to the terminal; or If authorization is performed, in an uplink direction, after receiving service data that is of the first service and that is sent by the terminal, terminating, by an access stratum of the radio access network node, transmission of the packet; or if authorization is not performed, prohibiting, by an access stratum of the radio access network node, from providing the first service for the terminal; or if authorization is not performed, refusing, by an access stratum of the radio access network node, to provide the first service for the terminal; or if authorization is not performed, generating, by an access stratum of the radio access network node, an indication for refusing to provide the first service, and sending the indication to the terminal (in this case, the radio access network node can receive a service request of the terminal before sending the indication to the terminal).

Optionally, the transceiver module 1410 of the radio access network node 1400 shown in FIG. 14 may correspond to the transceiver 1503 of the radio access network node 1500 shown in FIG. 15, and the processing module 1420 may correspond to the processor 1501 of the radio access network node 1500 shown in FIG. 15. In another implementation, the transceiver 1503 may be divided into both a receiver and a transmitter for implementation.

In this embodiment of this application, the radio access network node 1400 may be a chip (or a chip system) installed in a radio access network node. In this case, the radio access network node 1400 may include a processor and an input/output interface. The processor may be communicatively connected to a transceiver of a core network device or a network device through the input/output interface. Optionally, the radio access network node 1400 further includes a memory, and the memory is communicatively connected to the processor. Optionally, the processor, the memory, and the transceiver may be communicatively connected to each other, the memory may be configured to store an instruction, and the processor is configured to execute the instruction stored in the memory, to control the transceiver to send information or a signal.

The method disclosed in the foregoing embodiments of this application may be applied to a processor, or implemented by the processor. The processor may be an integrated circuit chip and has a signal processing capability. In an implementation process, steps in the foregoing method embodiments may be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, a discrete hardware component, or may be a system on chip (SoC), or may be a central processing unit (CPU), or may be a network processor (NP), or may be a digital signal processing circuit (DSP), or may be a micro control unit (MCU), or may be a programmable controller (programmable logic device, PLD) or another integrated chip. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and completed by using a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in a memory, and the processor reads information from the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory RAM), and is used as an external cache. In an example instead of limitation, many forms of RAMs are available, for example, a static random access memory (static rAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the method that are described in this specification is to include but is not limited to these memories and a memory of any other proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that units and algorithm steps in the examples described with reference to the embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing described system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a first communications device, first information from a third communications device;
sending, by the third communications device, the first information to the first communications device; and
when the first information indicates that a second communications device needs to perform time synchronization, providing, by the first communications device, time information for the second communications device, wherein the first information carries at least one of first indication information or first time accuracy information, the first indication information indicates that the second communications device needs to perform time synchronization, and the first time accuracy information indicates accuracy required for the time synchronization; or
when the first information indicates that a second communications device does not need to perform time synchronization, refraining, by the first communications device, from providing time information for the second communications device, wherein the first information carries at least one of second indication information or second time accuracy information, the second indication information indicates that the second communications device does not need to perform time synchronization, and the second time accuracy information indicates that accuracy required for the time synchronization is a preset value.

2. The method according to claim 1, wherein the method further comprises:
storing, by the first communications device, the first information to a context of the second communications device.

3. The method according to claim 1, wherein the providing time information for the second communications device comprises:
providing, by the first communications device, the second communications device with time information of a reference clock to perform the time synchronization with the reference clock.

4. The method according to claim 1, wherein the method further comprises:
sending, by the first communications device, a time synchronization message to the second communications device, wherein the time synchronization message is used by the second communications device to obtain the time information.

5. The method according to claim 4, wherein when the first information indicates that the second communications device needs to perform time synchronization, the time synchronization message comprises one or more of the following information: time information corresponding to first time accuracy information, scrambling information used to decode the time information, key information used to decrypt the time information, timer information used to perform the time synchronization with the first communications device, a radio resource required for the time synchronization, or a reference signal required for the time synchronization; or
when the first information indicates that the second communications device does not need to perform time synchronization, the time synchronization message comprises information indicating that a request of the second communications device for performing the time synchronization is rejected.

6. The method according to claim 1, wherein the sending, by a third communications device, first information to a first communications device, comprises:
sending, by the third communications device, a UE context modification request to the first communications device, wherein the UE context modification request includes the first information, wherein the first communications device is an access network device, the second communications device is a terminal device, and the third communications device is a core network device;
and the receiving, by the first communications device, the first information from the third communications device, comprises:
receiving, by the first communications device, the UE context modification request from the third communications device.

7. The method according to claim 1, wherein the sending, by a third communications device, first information to a first communications device, comprises:
sending, by the third communications device, a handover request to the first communications device, wherein the handover request includes the first information, wherein the first communications device is a source base station, the second communications device is a terminal device, and the third communications device is a target base station;
and the receiving, by the first communications device, the first information from the third communications device, comprises:
receiving, by the first communications device, the handover request from the third communications device.

8. The method according to claim 1, wherein the sending, by a third communications device, first information to a first communications device, comprises:
sending, by the third communications device, a retrieve UE context request acknowledge from a third communications device, wherein the retrieve UE context request acknowledge includes the first information, wherein the first communications device is a target base station, the second communications device is a terminal device, and the third communications device is a source base station;
and the receiving, by the first communications device, the first information from the third communications device, comprises:
receiving, by the first communications device, the retrieve UE context request acknowledge from the third communications device.

9. The method according to claim 1, wherein the method further comprises:
sending, by the first communications device, a response message of the first information to the third communications device, wherein the response message indicates that the first communications device obtains the first information; and
receiving, by the third communications device, the response message from the first communications device.

10. A communication system, comprising a first communications device and a third communications device ;
wherein the first communications device comprises:
at least one first processor; and
one or more first memories coupled to the at least one first processor and storing first programming instructions for execution by the at least one first processor to cause the first communications device to:
receive a first information from a third communications device; and
when the first information indicates that a second communications device needs to perform time synchronization, provide time information for the second communications device, wherein the first information carries at least one of first indication information or first time accuracy information, the first indication information indicates that the second communications device needs to perform time synchronization, and the first time accuracy information indicates accuracy required for the time synchronization; or
when the first information indicates that a second communications device does not need to perform time synchronization, refrain from providing time information for the second communications device, wherein the first information carries at least one of second indication information or second time accuracy information, the second indication information indicates that the second communications device does not need to perform time synchronization, and the second time accuracy information indicates that accuracy required for the time synchronization is a preset value; and wherein the third communications device comprises:
  at least one third processor; and
  one or more third memories coupled to the at least one third processor and storing third programming instructions for execution by the at least one third processor to cause the third communications device to:
    send the first information to the first communications device.

11. The system according to claim 10, wherein the first programming instructions, when executed by the at least one first processor, cause the first communications device to:
  store the first information to a context of the second communications device.

12. The system according to claim 10, wherein the first programming instructions, when executed by the at least one first processor, cause the first communications device to:
  provide the second communications device with time information of a reference clock to perform the time synchronization with the reference clock.

13. The system according to claim 10, wherein the first programming instructions, when executed by the at least one first processor, cause the first communications device to:
  send a time synchronization message to the second communications device, wherein the time synchronization message is used by the second communications device to obtain the time information.

14. The system according to claim 13, wherein when the first information indicates that the second communications device needs to perform time synchronization, the time synchronization message comprises one or more of the following information: time information corresponding to first time accuracy information, scrambling information used to decode the time information, key information used to decrypt the time information, timer information used to perform the time synchronization with the first communications device, a radio resource required for the time synchronization, or a reference signal required for the time synchronization; or
  when the first information indicates that the second communications device does not need to perform time synchronization, the time synchronization message comprises information indicating that a request of the second communications device for performing the time synchronization is rejected.

15. The system according to claim 10, wherein the third programming instructions, when executed by the at least one third processor, cause the third communications device to:
  send a UE context modification request to the first communications device, wherein the UE context modification request includes the first information, wherein the first communications device is an access network device, the second communications device is a terminal device, and the third communications device is a core network device;
  and the first programming instructions, when executed by the at least one first processor, cause the first communications device to:
  receive the UE context modification request from the third communications device.

16. The system according to claim 10, wherein the third programming instructions, when executed by the at least one third processor, cause the third communications device to:
  send a handover request to the first communications device, wherein the handover request includes the first information, wherein the first communications device is a source base station, the second communications device is a terminal device, and the third communications device is a target base station;
  and the first programming instructions, when executed by the at least one first processor, cause the first communications device to:
  receive the handover request from the third communications device.

17. The system according to claim 10, wherein the third programming instructions, when executed by the at least one third processor, cause the third communications device to:
  send a retrieve UE context request acknowledge from a third communications device, wherein the retrieve UE context request acknowledge includes the first information, wherein the first communications device is a target base station, the second communications device is a terminal device, and the third communications device is a source base station;
  and the first programming instructions, when executed by the at least one first processor, cause the first communications device to:
  receive the retrieve UE context request acknowledge from the third communications device.

18. The system according to claim 10, wherein
  the first programming instructions, when executed by the at least one first processor, cause the first communications device to:
  send a response message of the first information to the third communications device, wherein the response message indicates that the first communications device obtains the first information; and
  the third programming instructions, when executed by the at least one third processor, cause the third communications device to:
  receive the response message from the first communications device.

* * * * *